United States Patent
Kyota

(10) Patent No.: US 8,378,002 B2
(45) Date of Patent: Feb. 19, 2013

(54) AQUEOUS INK COMPOSITION, AQUEOUS INK COMPOSITION FOR INKJET RECORDING, AND INKJET RECORDING METHOD

(75) Inventor: Hirokazu Kyota, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 895 days.

(21) Appl. No.: 12/499,091

(22) Filed: Jul. 8, 2009

(65) Prior Publication Data
US 2010/0015360 A1 Jan. 21, 2010

(30) Foreign Application Priority Data

Jul. 16, 2008 (JP) .................. 2008-184510
Jul. 16, 2008 (JP) .................. 2008-185207

(51) Int. Cl.
C09D 11/00 (2006.01)
C08F 2/50 (2006.01)

(52) U.S. Cl. ............. 522/16; 522/17; 522/21; 522/50; 522/53; 522/184; 427/511

(58) Field of Classification Search .......... 522/53, 522/16, 17, 21, 50, 184; 427/511
See application file for complete search history.

(56) References Cited

U.S. PATENT DOCUMENTS

| 4,134,813 | A | 1/1979 | Kuesters et al. |
| 7,037,953 | B2 * | 5/2006 | Chatterjee et al. ......... 522/84 |
| 2005/0288384 | A1 | 12/2005 | Kanke et al. |
| 2008/0182031 | A1 * | 7/2008 | Matsumura et al. ....... 427/519 |

FOREIGN PATENT DOCUMENTS

| EP | 1944173 A | 7/2008 |
| JP | 1-253731 A | 10/1989 |
| JP | 6-308727 A | 11/1994 |
| JP | 2004-285216 A | 10/2004 |
| JP | 2005-307199 A | 11/2005 |

OTHER PUBLICATIONS

Bruce M. Monroe et al., Chemical Review, vol. 93, pp. 435-448 (1993). The extended European Search Report in a counterpart application (European Patent Application No. 09165361.8) dated Oct. 30, 2009.

* cited by examiner

*Primary Examiner* — Vu A Nguyen
(74) *Attorney, Agent, or Firm* — SOLARIS Intellectual Property Group, PLLC

(57) ABSTRACT

The present invention provides an aqueous ink composition including at least a sensitizing dye represented by the following Formula (i), an ethylenically unsaturated bond-containing water-soluble polymerizable compound, a polymerization initiator and water:

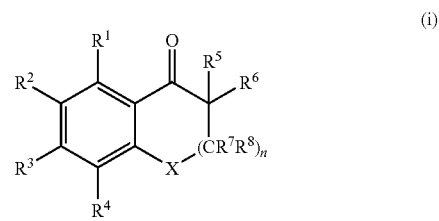

(i)

wherein, in Formula (i), X represents O, S or NR; n represents an integer of 0 or 1; R represents a hydrogen atom, an alkyl group or an acyl group; each of $R^1$, $R^2$, $R^3$, $R^4$, $R^5$, $R^6$, $R^7$ and $R^8$ independently represents a hydrogen atom or a monovalent substituent, provided that any neighboring two of $R^1$, $R^2$, $R^3$ and $R^4$ may be bonded to each other to form a ring, and $R^5$ and $R^7$ or $R^8$, or $R^6$ and $R^7$ or $R^8$, may be bonded to each other to form an aliphatic ring but do not form an aromatic ring.

7 Claims, 1 Drawing Sheet

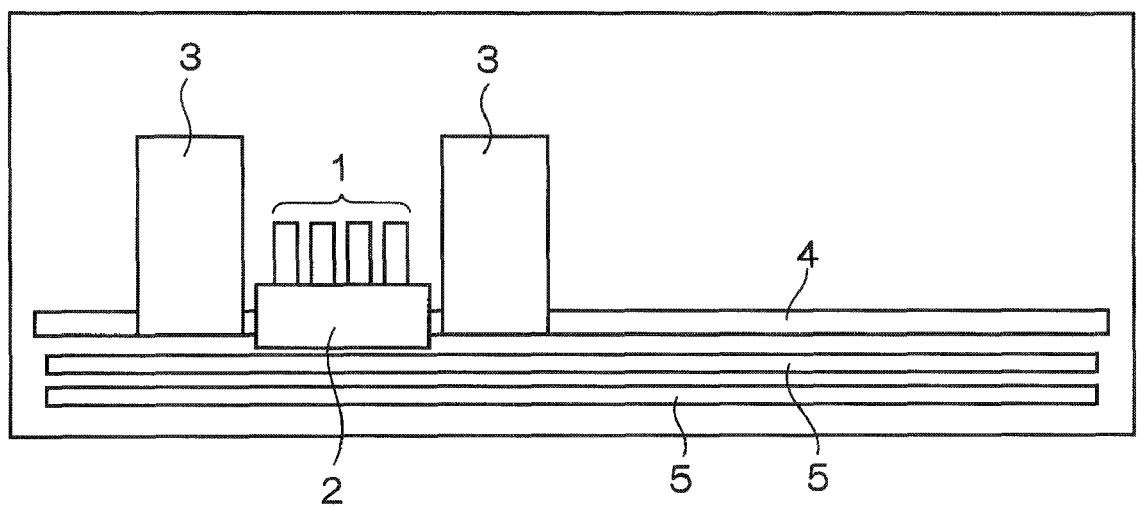

AQUEOUS INK COMPOSITION, AQUEOUS INK COMPOSITION FOR INKJET RECORDING, AND INKJET RECORDING METHOD

CROSS-REFERENCE TO RELATED APPLICATION

This application claims priority under 35 USC 119 from Japanese Patent Applications No. 2008-184510 filed on Jul. 16, 2008 and No. 2008-185207 filed on Jul. 16, 2008, the disclosures of which are incorporated by reference herein.

BACKGROUND

1. Field of the Invention

The present invention relates to a radiation-curing aqueous ink composition used preferably for inkjet recording and to an inkjet recording method. Specifically, the invention relates to a radiation-curing aqueous ink composition which is excellent in jetting reliability and curable with high sensitivity by irradiation with a radiation, a radiation-curing aqueous ink composition for inkjet recording, and an inkjet recording method.

2. Related Art

With regard to an image recording method for forming an image on a recording medium such as paper based on an image data signal, there are an electrophotographic system, sublimation type and melt type thermal transfer systems, an inkjet system, etc. In the electrophotographic system, a process of forming an electrostatic latent image on a photoreceptor drum by electrically charging and exposing to light is required, and the system is complicated; as a result, there is the problem that the production cost is high. With regard to the thermal transfer system, although the equipment is inexpensive, due to the use of an ink ribbon there is the problem that the running cost is high and waste material is generated.

With regard to the inkjet system, on the other hand, the equipment is inexpensive, and since an image is formed directly on a recording medium by jetting an ink only on a required image area, there is an advantage that the ink can be used efficiently and the running cost is low. Furthermore, there is little noise and it is excellent as an image recording system.

An ink composition that can be cured by irradiation with radiations such as ultraviolet rays (radiation-curing ink composition), for example an ink composition for inkjet recording, is required to be curable with high sensitivity to form a high-quality image.

Since high curability by irradiation with radiations is conferred by achieving higher sensitivity, an image recording method is obtained which has a large number of benefits such as a reduction in power consumption, longer lifetime due to a decrease in the load on a radiation generator, and achievement of sufficient curing which enables prevention of reduction in volatilization of uncured low molecular weight material and prevention of reduction in the strength of a formed image.

In particular, the radiation-curing aqueous ink can be preferably used in image printing, in pretreatment for conferring printability on a recording medium and in posttreatment for protection/modification of printed images, is excellent in safety due to use of water as a main solvent, is able to form high-quality images because of a small content of a curable component, is applicable to high-density inkjet recording due to low viscosity, and is thus an art having many excellent features and possibilities.

Fundamental constituent materials of the radiation-curing aqueous ink are water, a polymerizable material, a polymerization initiator that initiates polymerization by generating a radical or the like by a radiation, and a colorant (a pigment or a dye). Among them, the polymerizable material and the polymerization initiator are prepared either in an emulsified state or in a solution state with water solubility conferred by suitable substituents. Examples of the radiation-curing ink wherein the polymerizable material and the polymerization initiator are water-soluble include those described in, for example, Japanese Patent Application Laid-Open (JP-A) No. 2005-307199, and examples of the active radiation-curing ink wherein the polymerizable material and the polymerization initiator are present in an emulsified state include those described in, for example, JP-A No. 2004-285216, and ink compositions for inkjet recording which produce films excellent in strength, flexibility and adhesiveness by light irradiation are described therein.

As photopolymerization initiators contained in UV-curing ink compositions for inkjet recording, benzil, benzoin, benzoin ethyl ether, Michler's ketone, anthraquinone, acridine, phenazine, benzophenone, and 2-ethylanthraquinone are generally used (see Bruce M. Monroe et al., Chemical Review, Vol. 93, pp. 435-448 (1993)). However, photopolymerizable compositions containing these photopolymerization initiators have low sensitivity and thus require a long time for image-wise exposure in forming images. Therefore, if there is slight vibration during operation, images with good image quality cannot be obtained in the case where fine images are desired to be formed. Further, since a long exposure time is accompanied by an increase in energy radiation in the exposure step, a measure against radiation of the great heat resulting therefrom is needed.

The ink composition used in the inkjet recording system needs various properties so that during storage, physical properties are not changed or precipitates are not generated (solution stability) and nozzle clogging is not generated (charge stability).

As a method of improving the radiation sensitivity of the radiation-curing polymerizable composition, use of various polymerization initiation systems is disclosed (Bruce M. Monroe et al., Chemical Review, Vol. 93, pp. 435-448 (1993), U.S. Pat. No. 4,134,813, JP-A No. 1-253731, and JP-A 6-308727). JP-A No. 2005-307199 makes use of initiators containing water-soluble acylphosphine oxides and thioxanthones applicable to radiation-curing aqueous ink compositions. However, there is none of examples where an initiator satisfying sufficient sensitivity to scanning exposure, storage stability, and charge stability is used in the aqueous ink composition for inkjet recording.

Accordingly, there is an earnest desire for a radiation-curing aqueous ink composition usable preferably in inkjet recording, which can, by irradiation even with a low-power radiation, be cured highly sensitively to form high-quality images and is excellent in storage stability and jetting stability.

SUMMARY

The present invention has been made in view of the above circumstances and provides an aqueous ink composition, an aqueous ink composition for inkjet recording, and an inkjet recording method.

A first aspect of the invention provides an aqueous ink composition comprising at least:
a sensitizing dye represented by the following Formula (i);
an ethylenically unsaturated bond-containing water-soluble polymerizable compound;
a polymerization initiator; and
water:

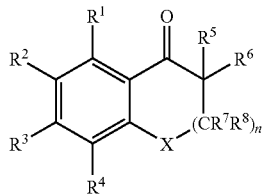

(i)

wherein, in Formula (i), X represents O, S or NR; n represents an integer of 0 or 1; R represents a hydrogen atom, an alkyl group or an acyl group; each of $R^1$, $R^2$, $R^3$, $R^4$, $R^5$, $R^6$, $R^7$ and $R^8$ independently represents a hydrogen atom or a monovalent substituent, provided that any neighboring two of $R^1$, $R^2$, $R^3$ and $R^4$ may be bonded to each other to form a ring, and $R^5$ and $R^7$ or $R^8$, or $R^6$ and $R^7$ or $R^8$, may be bonded to each other to form an aliphatic ring but do not form an aromatic ring.

A second aspect of the invention provides an ink composition comprising:
a sensitizing dye represented by the following Formula (i);
a polymerization initiator;
an ethylenically unsaturated bond-containing water-soluble polymerizable compound; and
water:

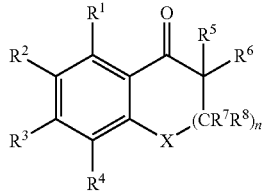

(i)

wherein, in Formula (i), X represents O, S or NR, where R represents a hydrogen atom, an alkyl group or an acyl group; n represents 0 or 1; each of $R^1$ to $R^8$ independently represents a hydrogen atom or a monovalent substituent, provided that any neighboring two of $R^1$, $R^2$, $R^3$ and $R^4$ may be bonded to each other to form a ring, and $R^5$ and $R^7$ or $R^8$, or $R^6$ and $R^7$ or $R^8$, may be bonded to each other to form an aliphatic ring but do not form an aromatic ring, and
wherein the polymerizable compound is present in an emulsified state in the ink composition.

BRIEF DESCRIPTION OF THE DRAWING

Exemplary embodiments of the present invention will be described in detail based on the following figure, wherein:
FIG. 1 is a schematic diagram of the front of a printer.

DETAILED DESCRIPTION OF THE INVENTION

An first object of the invention is to provide a radiation-curing aqueous ink composition which is cured highly sensitively by irradiation even with a low-power radiation, has high storage stability, and does not cause clogging in nozzles during jetting, when used in inkjet recording, and an inkjet recording method which when the aqueous ink composition is used, can form high-quality images.

To achieve the first object, the inventors made extensive study, and as a result, found that the compound represented by formula (i) below (also referred to hereinafter as the specific sensitizing dye) exhibits a high sensitizing effect, and an aqueous ink composition using the specific sensitizing dye in an initiation system has high sensitivity, excellent storage stability and jetting stability, and the invention was thereby completed.

That is, a first object of the invention is achieved by the following first exemplary aspect of the invention.

<1> An ink composition comprising:
a sensitizing dye represented by the following Formula (i);
a polymerization initiator;
an ethylenically unsaturated bond-containing water-soluble polymerizable compound; and
water:

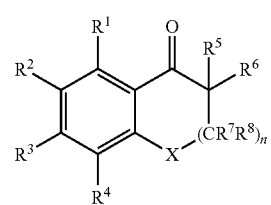

(i)

wherein, in Formula (i), X represents O, S or NR, where R represents a hydrogen atom, an alkyl group or an acyl group; n represents 0 or 1; each of $R^1$ to $R^8$ independently represents a hydrogen atom or a monovalent substituent, provided that any neighboring two of $R^1$, $R^2$, $R^3$ and $R^4$ may be bonded to each other to form a ring, and $R^5$ and $R^7$ or $R^8$, or $R^6$ and $R^7$ or $R^8$, may be bonded to each other to form an aliphatic ring but do not form an aromatic ring, and
wherein the polymerizable compound is present in an emulsified state in the ink composition.

<2> The aqueous ink composition of <1>, wherein at least one of $R^1$, $R^2$, $R^3$, $R^4$, $R^5$, $R^6$, $R^7$ and $R^8$ in the sensitizing dye represented by Formula (i) is a substituent having a carboxyl group or a salt thereof.

<3> The aqueous ink composition of <1> or <2>, wherein the ethylenically unsaturated bond-containing water-soluble polymerizable compound is at least one selected from the group consisting of an unsaturated carboxylic acid, an unsaturated carboxylate, and a compound having both a poly(alkyleneoxy) group and an ethylenically unsaturated group.

<4> The aqueous ink composition of any one of <1> to <3>, wherein the polymerization initiator is a water-soluble polymerization initiator.

<5> The aqueous ink composition of any one of <1> to <4>, wherein the polymerization initiator is at least one selected from the group consisting of α-aminoketones and acylphosphine oxides.

<6> The aqueous ink composition of any one of <1> to <5>, further comprising a colorant.

<7> An inkjet recording method, comprising:
(a) jetting the aqueous ink composition of any one of <1> to <6> onto a recording medium, and
(b) irradiating the jetted aqueous ink composition with active irradiation to cure the aqueous ink composition.

The action of the compound represented by the formula (i) in the invention is not evident, and the compound is estimated to act as a sensitizing dye on polymerization initiators such as α-aminoketones and acylphosphine oxides. That is, it is estimated that the compound represented by the formula (i) has high triplet excitation energy and efficiently causes triplet energy transfer to the polymerization initiators such as α-aminoketones and acylphosphine oxides so that the ink composition can be cured with high sensitivity. It is also estimated that because the compound represented by the formula (i) is hardly precipitated with lower crystallinity than thioxanthone compounds used generally as sensitizing dyes sensitizing with such mechanism, the compound is excellent in stability in a solution of the aqueous ink composition, and the aqueous ink composition containing the same, when used in inkjet recording, can attain excellent jetting stability.

As described above, the aqueous ink composition of the invention can simultaneously meet high sensitization, storage stability and jetting stability.

According to the first aspect of the invention, there can be provided a radiation-curing aqueous ink composition which is cured highly sensitively by irradiation even with a low-power radiation, has high storage stability, and does not cause clogging in nozzles during jetting, when used in inkjet recording, and an inkjet recording method which when the aqueous ink composition is used, can form high-quality images.

An second object of the invention is to provide an active radiation-curing aqueous ink composition which can be cured highly sensitively by irradiation even with a low-power radiation to form high-quality images and does not cause clogging in nozzles during jetting, when used in inkjet recording, and an inkjet recording method using the ink composition.

To achieve the second object, the inventors made extensive study, and as a result, found that the second object can be achieved by allowing a polymerizable compound to be present in an emulsified state in a system and simultaneously by using a polymerization initiator in combination with a specific sensitizing dye, and the second exemplary aspect of the invention was thereby completed.

That is, the constitution of the second aspect of the invention is as follows:

[1] An ink composition comprising:
  a sensitizing dye represented by the following Formula (i);
  a polymerization initiator;
  an ethylenically unsaturated bond-containing water-soluble polymerizable compound; and
  water:

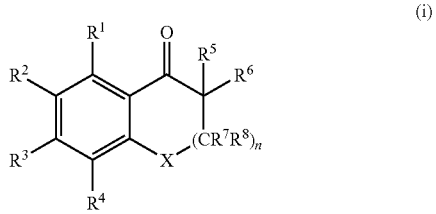

(i)

wherein, in Formula (i), X represents O, S or NR, where R represents a hydrogen atom, an alkyl group or an acyl group; n represents 0 or 1; each of $R^1$ to $R^8$ independently represents a hydrogen atom or a monovalent substituent, provided that any neighboring two of $R^1$, $R^2$, $R^3$ and $R^4$ may be bonded to each other to form a ring, and $R^5$ and $R^7$ or $R^8$, or $R^6$ and $R^7$ or $R^8$, may be bonded to each other to form an aliphatic ring but do not form an aromatic ring, and wherein the polymerizable compound is present in an emulsified state in the ink composition.

[2] The ink composition of [1], wherein the polymerization initiator comprises at least one selected from the group consisting of α-aminoketones and acylphosphine oxides.

[3] The ink composition of [1] or [2], further comprising a colorant which is a pigment.

[4] An inkjet recording method, comprising:
  (a) jetting the ink composition of any one of [1] to [3] onto a recording medium, and
  (b) irradiating the jetted ink composition with active irradiation to cure the ink composition.

Although the action of the compound in the invention is not evident, the working mechanism of the compound is estimated as follows:

The sensitizing dye represented by the formula (i), which is used in the invention, has high triplet excitation energy and efficiently causes triplet energy transfer to a simultaneously used polymerization initiator, particularly to the polymerization initiator used in a preferable aspect of the invention, such as α-aminoketone and acylphosphine oxide, thereby highly accurately generating an initiating species with which the polymerizable compound present in an emulsified state in an aqueous medium can be cured with high accuracy. It is also estimated that because the compound represented by the formula (i) is hardly precipitated with lower crystallinity than thioxanthone compounds used generally as sensitizing dyes sensitizing with such mechanism, the compound is excellent in stability in a solution of the ink composition, and the ink composition containing the same, when used for inkjet recording, can attain excellent jetting stability.

As described above, it is considered that the invention can simultaneously meet high sensitization, storage stability and jetting stability.

According to the second aspect of the invention, there can be provided an active radiation-curing aqueous ink composition which can be cured highly sensitively by irradiation even with a low-power radiation to form high-quality images and does not cause clogging in nozzles during jetting, when used in inkjet recording, and an inkjet recording method using the ink composition.

-First Aspect-

Hereinafter, the first aspect of the invention (also referred to hereinafter as the invention) will be described in detail with reference to a preferable exemplary embodiment. In view of an object described above, the aqueous ink composition containing at least (A) a specific sensitizing dye, (B) an ethylenically unsaturated bond-containing water-soluble polymerizable compound, (C) a polymerization initiator, and (D) water was found to serve as an excellent aqueous ink composition simultaneously meeting high sensitization, solution stability and jetting stability, and the invention was thereby arrived at.

Hereinafter, the action and effect of printing by the inkjet recording system as the main example to which the radiation-curing aqueous ink composition of the invention can be applied will be described.

The radiation usable in the invention includes ultraviolet rays and electron rays. The description which follows may proceed by referring, as a typical example, to the UV-curing aqueous ink composition using particularly preferable ultraviolet rays. However, it is not thereby meant that the radiation is limited to ultraviolet rays.

The radiation-curing aqueous ink composition of the invention shows ink absorption particularly onto plain paper, but for a recording medium in which improvements in the color of a color material and in scratch resistance are considered difficult, the ink composition exhibits a significant effect on such improvements. Further, the radiation-curing aqueous ink composition of the invention enables printing a nonabsorbable recording medium with the aqueous ink composition.

To use the radiation-curing aqueous ink composition of the invention in the inkjet recording system, its viscosity should naturally be in an appropriate range, and its surface tension is also preferably optimized from the viewpoint of the balance between curing and penetration to enable formation of high-quality and high-density images particularly on plain paper. Jetting stability is also important, and from this viewpoint, the polymerizable compound and polymerization initiator are preferably those compounds which are highly soluble in an aqueous medium and hardly precipitated in the system.

Now, the constituent materials in the radiation-curing aqueous ink composition of the invention having the excellent action and effect described above, and the inkjet recording method using the radiation-curing aqueous ink composition, are specifically described.

The aqueous ink composition of the invention will be described.

<(A) Compound Represented by the Formula (i)>

The radiation-curing aqueous ink composition of the invention contains at least (A) a sensitizing dye represented by the formula (i) below, (B) an ethylenically unsaturated bond-containing water-soluble polymerizable compound, (C) a polymerization initiator, and (D) water.

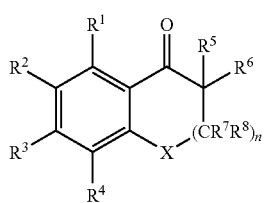

(i)

In the formula (i), X represents O, S or NR; n represents an integer of 0 or 1; R represents a hydrogen atom, an alkyl group or an acyl group; each of $R^1$, $R^2$, $R^3$, $R^4$, $R^5$, $R^6$, $R^7$ and $R^8$ independently represents a hydrogen atom or a monovalent substituent, provided that any neighboring two of $R^1$, $R^2$, $R^3$ and $R^4$ may be bonded to each other to form a ring, and $R^5$ and $R^7$ or $R^8$, or $R^6$ and $R^7$ or $R^8$, may be bonded to each other to form an aliphatic ring but do not form an aromatic ring.

In the invention, the ethylenically unsaturated bond-containing water-soluble polymerizable compound (B) to which the polymerization initiator and the specific sensitizing dye are added is used to prepare an aqueous ink composition. At this time, both the polymerization initiator and the specific polymerization initiator used to prepare an aqueous ink composition are preferably water-soluble. When a water-insoluble specific sensitizing dye not having a hydrophilic group or a water-insoluble polymerization initiator is used, the aqueous ink composition of the invention can be prepared by a method of emulsification with a surfactant or the like or a method of dispersion with a pigment.

As the surfactant described above, it is possible to employ anionic surfactants such as dialkyl sulfosuccinates, alkyl naphthalene sulfonates and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkyl amine salts and quaternary ammonium salts. Particularly, anionic surfactants and nonionic surfactants can be preferably used.

In the invention, a high-molecular surfactant can also be used, and the following water-soluble resins can be mentioned as preferable high-molecular surfactants, from the viewpoint of jetting stability. The high-molecular surfactants that can be preferably used as water-soluble resins include styrene-acrylic acid-alkyl acrylate ester copolymers, styrene-acrylic acid copolymers, styrene-maleic acid-alkyl acrylate ester copolymers, styrene-maleic acid copolymers, styrene-methacrylic acid-alkyl acrylate ester copolymers, styrene-methacrylic acid copolymers, styrene-maleic acid half ester copolymers, vinyl naphthalene-acrylic acid copolymers, and vinyl naphthalene-maleic acid copolymers.

The compound (A) represented by the formula (i) will be described. This compound is estimated to act as a sensitizing dye for polymerization initiators such as α-aminoketones and acylphosphine oxides. Generally, the sensitizing dye absorbs a specific radiation to attain an electronically excited state. It is estimated that the sensitizing dye in an electronically excited state causes actions such as electron transfer, energy transfer, or heat generation upon contact with the polymerization initiator, thereby inducing a chemical change in the polymerization initiator, that is, promoting the decomposition thereof, to promote formation of active species such as a radical, an acid, or a base, and the active species generated herein polymerizes (B) the ethylenically unsaturated bond-containing water-soluble polymerizable compound to induce and promote the curing reaction.

As the sensitizing dye, a compound corresponding to the wavelength of the active radiation that causes a polymerization initiator used in the ink composition to generate an initiating species may be used. However, considering that the sensitizing dye is used in a curing reaction of a general ink composition, preferable examples of the sensitizing dyes belong to those compounds that have an absorption wavelength in the range of 350 to 450 nm. The aqueous ink composition of the invention requires incorporation of one or more specific sensitizing dyes belonging to compounds shown later.

The compound represented by the formula (i) is preferably water-soluble. The solubility of this compound in distilled water at room temperature is preferably 0.5 wt % or more, more preferably 1 wt % or more, still more preferably 3 wt % or more.

$R^1$, $R^2$, $R^3$, $R^4$, $R^5$, $R^6$, $R^7$ and $R^8$ independently represent a hydrogen atom or a monovalent substituent, and to make the compound water-soluble, at least one of $R^1$, $R^2$, $R^3$, $R^4$, $R^5$, $R^6$, $R^7$ and $R^8$ is preferably a hydrophilic group. Specific examples of the hydrophilic group include a carboxyl group ($CO_2H$), its salt (the counter salt is not limited. The sodium salt, potassium salt, ammonium salt, pyridinium salt or the like is preferable.), a sulfo group ($SO_3H$), its salt, a hydroxyl group, an amino group, a (poly)ethyleneoxy group, a (poly)propyleneoxy group, etc., among which a carboxyl group ($CO_2H$) or its salt is more preferable.

The compound (A) can be made water-soluble by conferring hydrophilicity by introducing one or more hydrophilic groups into the molecule. Introduction of hydrophilic groups at the positions of $R^7$ and $R^8$ in the formula (i) is preferable from the viewpoint of synthesis ease and costs.

When $R^1$, $R^2$, $R^3$, $R^4$, $R^5$, $R^6$, $R^7$ or $R^8$ represents a monovalent substituent, the monovalent substituent includes a halogen atom, an aliphatic group, an aromatic group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, a carboxyl group and a sulfo group, among which an alkyl group and a halogen atom are preferable.

When $R^1$, $R^2$, $R^3$, $R^4$, $R^5$, $R^6$, $R^7$ or $R^8$ in the formula (i) represents an alkyl group as the monovalent substituent, the alkyl group is preferably an alkyl group having 1 to 10 carbon atoms, more preferably an alkyl group having 1 to 4 carbon atoms such as a methyl group, an ethyl group, a propyl group, an n-butyl group, a sec-butyl group, a t-butyl group or the like.

When the monovalent substituent is an alkoxy group, the alkoxy group is preferably an alkoxy group having 1 to 4 carbon atoms, such as a methoxy group, an ethoxy group, a hydroxyethoxy group, a propoxy group, an n-butoxy group, an isobutoxy group, a sec-butoxy group, a t-butoxy group or the like.

The halogen atom includes a fluorine atom, a chlorine atom, a bromine atom and an iodine atom.

Neighboring two of $R^1$, $R^2$, $R^3$ and $R^4$ may be bound (e.g. condensed) to each other to form a ring.

When these groups form a ring, the ring structure includes a 5- to 6-memberred aliphatic and an aromatic ring and may be a heterocycle containing an element other than carbon atoms, and the rings thus formed may further be combined to form a 2-nucleus ring, for example a condensed ring. These ring structures may further have each substituent illustrated as the monovalent substituent represented by each of $R^1$ to $R^8$ in the formula (i). When the formed ring structure is a heterocycle, examples of the heteroatom in the heterocycle include N, O and S.

When n=1, $R^5$ or $R^6$, and $R^7$ or $R^8$, may be bound to each other to form an aliphatic ring but do not form an aromatic ring. The aliphatic ring is preferably a 3- to 6-memberred ring, more preferably a 5- or 6-memberred ring.

The sensitizing dye which can be more preferably used includes sensitizing dyes represented by the following formula (iA):

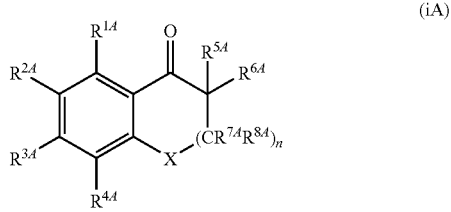

(iA)

In the formula (iA), X represents O or S. n represents 0 or 1. $R^{1A}$, $R^{2A}$, $R^{3A}$, $R^{4A}$, $R^{5A}$, $R^{6A}$, $R^{7A}$ and $R^{8A}$ independently represent a hydrogen atom, an alkyl group, a halogen atom, a hydroxyl group, a cyano group, a nitro group, an amino group, an alkylthio group, an alkylamino group, an alkoxy group, an alkoxycarbonyl group, an acyloxy group, an acyl group and a carboxyl group (including its salt) or a sulfo group (including its salt), and at least one is preferably a carboxyl group (including its salt) or a sulfo group (including its salt). Neighboring two of $R^{1A}$, $R^{2A}$, $R^{3A}$ and $R^{4A}$ may be bound (condensed) to each other to form a ring. $R^{5A}$ or $R^{6A}$, and $R^{7A}$ or $R^{8A}$, may be bound to each other to form an aliphatic ring but do not form an aromatic ring.

The sensitizing dye which can be preferably used includes sensitizing dyes represented by the following formula (iB):

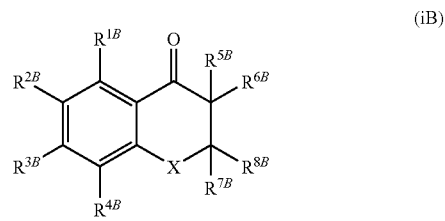

(iB)

In the formula (iB), X represents O or S. $R^{1B}$, $R^{2B}$, $R^{3B}$, $R^{4B}$, $R^{5B}$, $R^{6B}$, $R^{7B}$ or $R^{8B}$ independently represent a hydrogen atom, an alkyl group, a halogen atom, a hydroxyl group, a cyano group, a nitro group, an amino group, an alkylthio group, an alkylamino group, an alkoxy group, an alkoxycarbonyl group, an acyloxy group, an acyl group (including its salt) and a carboxyl group (including its salt) or a sulfo group, at least one is preferably a carboxyl group (or its salt) or a sulfo group (or its salt), and at least one is more preferably a carboxyl group (or its salt). Neighboring two of $R^{1B}$, $R^{2B}$, $R^{3B}$ and $R^{4B}$ may be bound (condensed) to each other to form a ring. $R^{5B}$ or $R^{6B}$, and $R^{7B}$ or $R^{8B}$, may be bound to each other to form an aliphatic ring but do not form an aromatic ring.

The sensitizing dye which can be further preferably used includes sensitizing dyes represented by the following formula (iC):

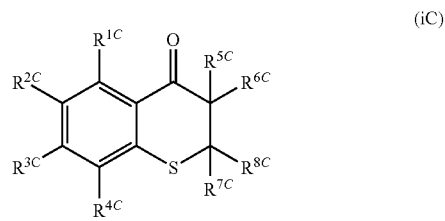

(iC)

In the formula (iC), $R^{1C}$, $R^{2C}$, $R^{3C}$, $R^{4C}$, $R^{5C}$, $R^{6C}$, $R^{7C}$ and $R^{8C}$ independently represent a hydrogen atom, an alkyl group, a halogen atom, a hydroxyl group, a cyano group, a nitro group, an amino group, an alkylthio group, an alkylamino group, an alkoxy group, an alkoxycarbonyl group, an acyloxy group, an acyl group, a carboxyl group (or its salt) or a sulfo group (or its salt), at least one is preferably a carboxyl group (or its salt) or a sulfo group (or its salt), and at least one is more preferably a carboxyl group (or its salt).

Neighboring two of $R^{1C}$, $R^{2C}$, $R^{3C}$ and $R^{4C}$ may be bound to each other to form a 5- to 6-memberred aliphatic or an aromatic ring which may be a heterocycle containing an element other than carbon atoms, and the rings thus formed may further be combined to form a 2-nucleus ring, for example a condensed ring. These ring structures may further have each substituent illustrated as the monovalent substituent represented by each of $R^1$, $R^2$, $R^3$, $R^4$, $R^5$, $R^6$, $R^7$ and $R^8$ in the formula (i). When the ring structure is a heterocycle, examples of the heteroatom in the heterocycle include N, O and S. $R^{5C}$ or $R^{6C}$, and $R^{7C}$ or $R^{8C}$, may be bound to each other to form an aliphatic ring but do not form an aromatic ring.

At least one of $R^{1C}$, $R^{2C}$, $R^{3C}$, $R^{4C}$, $R^{5C}$, $R^{6C}$, $R^{7C}$ and $R^{8C}$ is preferably a halogen atom. More preferably, each of $R^{1C}$, $R^{2C}$, $R^{3C}$ and $R^{4C}$ is a halogen atom as the substituent, and most preferably $R^{2C}$ is a halogen atom. The number of halogen atoms is preferably 1 or 2, more preferably 1.

$R^{2C}$ is preferably a substituent other than hydrogen, more preferably an alkyl group, a halogen atom, an acyloxy group, or an alkoxycarbonyl group, among which an alkyl group and a halogen atom are preferable because of high sensitivity due to good matching with a light source.

Preferably, either of $R^{7C}$ or $R^{8C}$ is a substituent group other than hydrogen, and more preferably, both of them are substituent groups other than hydrogen. Preferable examples of the substituent group include an alkyl group, a halogen atom, a carboxyl group and an alkoxycarbonyl group, among which an alkyl group and an alkoxycarbonyl group are preferable, and an alkyl group is most preferable.

The halogen atom includes a fluorine atom, a chlorine atom, a bromine atom and an iodine atom, among which a chlorine atom, a bromine atom and an iodine atom are preferable.

The alkyl group is preferably an alkyl group having 1 to 10 carbon atoms, more preferably an alkyl group having 1 to 4 carbon atoms, such as a methyl group, an ethyl group, a propyl group, an n-butyl group, a sec-butyl group, a t-butyl group or the like.

The acyloxy group is preferably an aliphatic acyloxy group having 2 to 10 carbon atoms, more preferably an aliphatic acyloxy group having 2 to 5 carbon atoms.

The alkoxycarbonyl group is preferably an aliphatic alkoxycarbonyl group having 2 to 10 carbon atoms, more preferably an alkoxycarbonyl group having 2 to 5 carbon atoms.

Specific examples of the specific sensitizing dye [Exemplary Compounds (i-1) to (i-28)] which can be used preferably in the invention are shown below, but the invention is not limited thereto. In the exemplified compounds (i-1) to (i-28), Me represents methyl group, $Bu^t$ represents tertiary-butyl group and $Pr^i$ represents isopropyl group. n in the exemplary compound i-8 represents an integer of from 1 to 200.

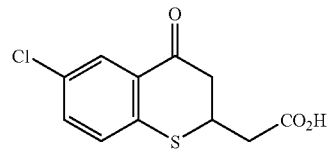
i-1

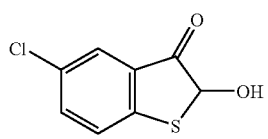
i-2

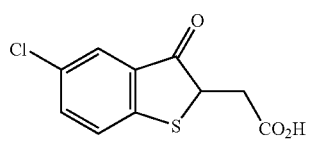
i-3

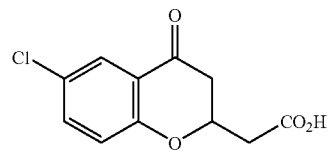
i-4

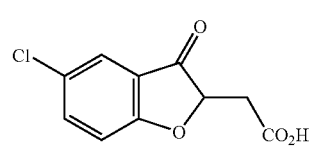
i-5

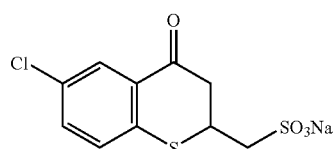
i-6

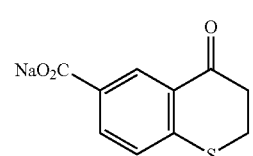
i-7

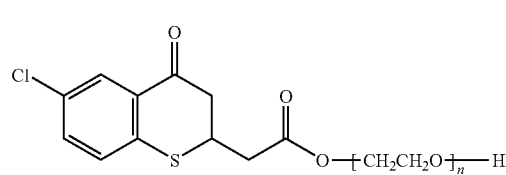
i-8

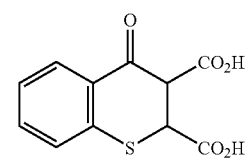
i-9

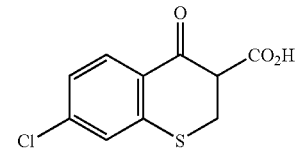
i-10

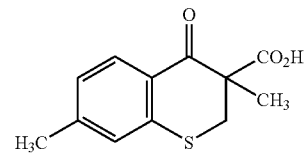
i-11

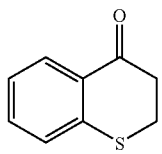
i-12

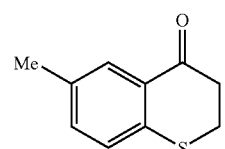
i-13

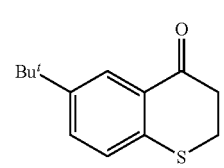
i-14 i-15 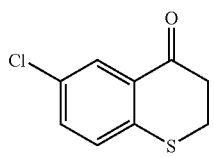

i-16 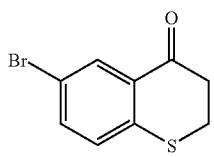

i-17 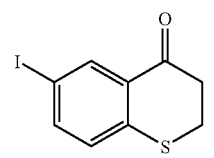

i-18 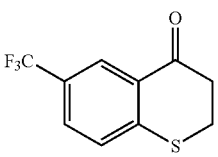

i-19 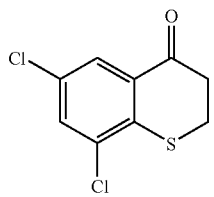

i-20 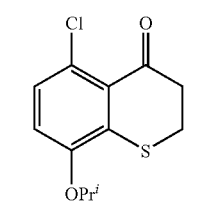

i-21 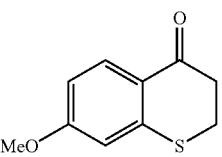

i-22 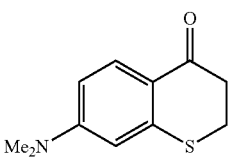

i-23 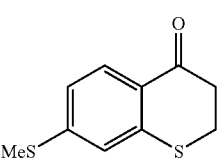

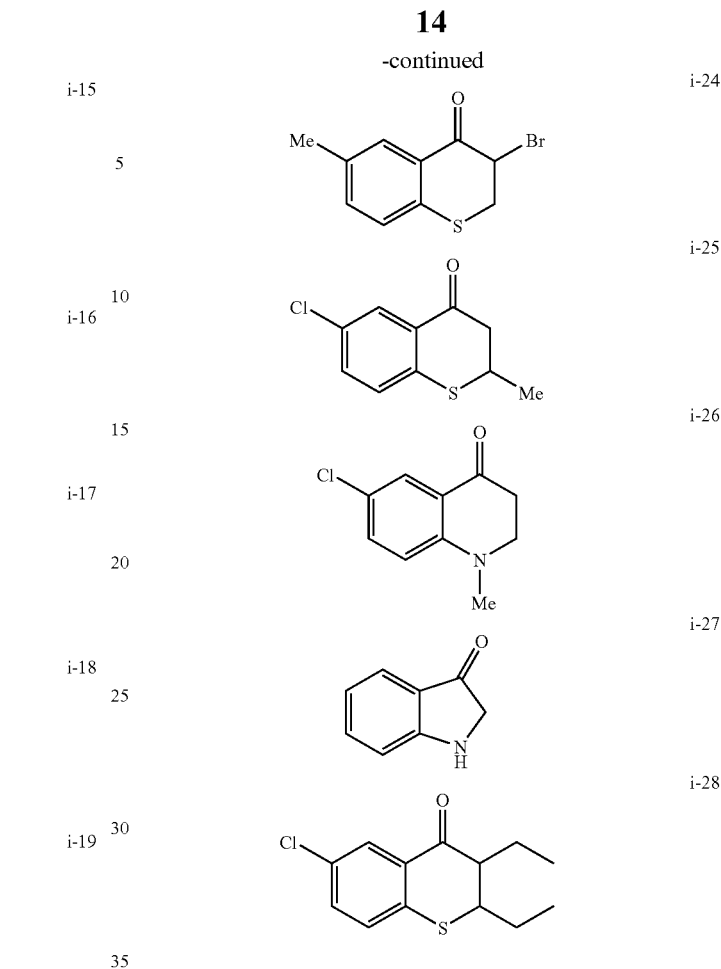

The specific sensitizing dye according to the invention can be synthesized by known methods described in, for example, JP-A Nos. 2-255677, 2004-189695, 2004-189695, Tetrahedron, vol. 49, p. 939 (1993), Journal of Organic Chemistry, p. 893 (1945), and Journal of Organic Chemistry, p. 4939 (1965).

The content of the specific sensitizing dye in the aqueous ink composition of the invention, in terms of solid content, is preferably in the range of about 0.05 to 30% by weight, more preferably 0.1 to 20% by weight, even more preferably 0.2 to 10% by weight, based on the aqueous ink composition.

This specific sensitizing dye hardly shows absorption in the visible light range and is thus also advantageous that the dye when added in an amount to exhibit its effect does not influence the hue of the aqueous ink composition.

The content of the specific sensitizing dye when described in connection with the polymerization initiator described later is that the weight ratio of the polymerization initiator: specific sensitizing dye is 200:1 to 1:200, preferably 50:1 to 1:50, more preferably 20:1 to 1:5.

<Other Sensitizing Dyes>

In the invention, known sensitizing dyes can also be used in combination with the specific sensitizing dye described above in such a range that the effect of the invention is not impaired. The solubility of other sensitizing dyes in distilled water at room temperature is preferably 0.5 wt % or more, more preferably 1 wt % or more, still more preferably 3 wt % or more. Other sensitizing dyes can be added to the specific sensitizing dye such that the specific sensitizing dye: other sensitizing dye weight ratio becomes 1:5 to 100:1, preferably 1:1 to 100:1, more preferably 2:1 to 100:1.

Examples of usable sensitizing dyes known in the art include benzophenone, thioxanthone, particularly isopropylthioxanthone, anthraquinone and 3-acylcoumarin derivatives, terphenyl, styryl ketone, and 3-(aroylmethylene)thiazoline, camphor quinone, eosin, rhodamine, and erythromycin.

Further examples of the usable sensitizing dyes are as follows:

(1) Thioxanthones

Thioxanthone, 2-isopropylthioxanthone, 2-chlorothioxanthone, 2-dodecylthioxanthone, 2,4-di-ethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di-[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthoine-3,4-dicarboxyimide, n-octylthioxanthone-3,4-dicarboxyimide, N-(1,1,3,3-tetramethylbutyl)thioxanthone-3,4-dicarboxyimide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propane aluminum chloride.

(2) Benzophenones

Benzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoyl benzoate, 4-(2-hydroxyethylthio)benzophenone, 4-(4-tolylthio)benzophenone, 4-benzoyl-N,N,N-trimethylbenzene methane aminium chloride, 2-hydroxy-3-(4-benzoylphenoxy)-N,N,N-trimethyl-1-propane aminium chloride monohydrate, 4-(13-acryloyl-1,4,7,10,13-pentaoxatridecyl)benzophenone, 4-benzoyl-N,N-dimethyl-N-[2-(1-oxo-2-propenyl)oxy]ethylbenzene methane aminium chloride.

(3) 3-Acyl Coumarins

3-Benzoylcoumarin, 3-benzoyl-7-methoxycoumarin, 3-benzoyl-5,7-di(propoxy)coumarin, 3-benzoyl-6,8-dichlorocoumarin, 3-benzoyl-6-chlorocoumarin, 3,3'-carbonylbis[5,7-di(propoxy)coumarin], 3,3'-carbonylbis(7-methoxycoumarin), 3,3'-carbonylbis(7-diethylaminocoumarin), 3-isobutyroylcoumarin, 3-benzoyl-5,7-dimethoxycoumarin, 3-benzoyl-5,7-diethoxycoumarin, 3-benzoyl-5,7-dibutoxycoumarin, 3-benzoyl-5,7-di(methoxyethoxy)coumarin, 3-benzoyl-5,7-di(allyloxy)coumarin, 3-benzoyl-7-dimethylaminocoumarin, 3-benzoyl-7-diethylaminocoumarin, 3-isobutyroyl-7-dimethylaminocoumarin, 5,7-dimethoxy-3-(1-naphthoyl)coumarin, 5,7-dimethoxy-3-(1-naphthoyl)coumarin, 3-benzoylbenzo[f]coumarin, 7-diethylamino-3-thienoylcoumarin, and 3-(4-cyanobenzoyl)-5,7-dimethoxycoumarin.

(4) 3-(Aroylmethylene)thiazolines

3-Methyl-2-benzoylmethylene-β-naphthothiazoline, 3-methyl-2-benzoylmethylenebenzothiazoline, 3-ethyl-2-propionylmethylene-β-naphthothiazoline.

(5) Anthracenes 9,10-Dimethoxy-anthracene, 9,10-diethoxy-anthracene, 9,10-dimethoxy-2-ethyl-anthracene.

(6) Other Carbonyl Compounds

Acetophenone, 3-methoxyacetophenone, 4-phenylacetophenone, benzil, 2-acetylnaphthalene, 2-naphthoaldehyde, 9,10-naphthoquinone, 9-fluorenone, dibenzosuberon, xanthone, 2,5-bis(4-diethylaminobenzylidene)cyclopentanone, α-(p-dimethylaminobenzylidene)ketone, for example 2-(4-dimethylaminobenzylidene)indan-1-one or 3-(4-dimethylaminophenyl)-1-indan-5-ylpropenone, 3-phenylthiophthalimide, and N-methyl-3,5-di(ethylthio)phthalimide.

<(C) Polymerization Initiator>

The aqueous ink composition of the invention contains (C) a polymerization initiator.

In the invention, the polymerization initiator is not particularly limited as long as the initiator when combined with the specific sensitizing dye has an excellent polymerization ability. The polymerization initiator is preferably water-soluble. The water solubility of the polymerization initiator in distilled water at 25° C. is preferably 0.5 wt % or more, more preferably 1% or more, still more preferably 3 wt % or more.

A polymerization initiator selected from α-aminoketones and acylphosphine oxides is preferably used.

As the α-aminoketone compound, it is preferable to use a compound having the structure represented by the following formula (1):

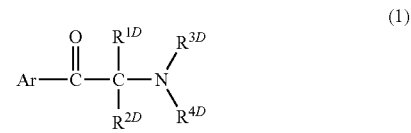

In the formula (1), Ar is a phenyl group which is substituted with $-SR^{13}$ or $-N(R^{7E})(R^{8E})$ wherein $R^{13}$ represents a hydrogen atom or an alkyl group.

$R^{1D}$ and $R^{2D}$ independently represent an alkyl group having 1 to 8 carbon atoms. $R^{1D}$ and $R^{2D}$ may be bound to each other to form an alkylene group having 2 to 9 carbon atoms. $R^{3D}$ and $R^{4D}$ independently represent a hydrogen atom, an alkyl group having 1 to 12 carbon atoms, an alkyl group having 2 to 4 carbon atoms which is substituted with an alkoxy group having 1 to 4 carbon atoms, or an alkenyl group having 3 to 5 carbon atoms. $R^{3D}$ and $R^{4D}$ may be bound to form an alkylene group having 3 to 7 carbon atoms, and the alkylene group may contain, in its alkylene chain, —O— or —N($R^{12}$)— wherein $R^{12}$ represents an alkyl group having 1 to 4 carbon atoms.

$R^{7E}$ and $R^{8E}$ independently represent a hydrogen atom, an alkyl group having 1 to 12 carbon atoms, an alkyl group having 2 to 4 carbon atoms which is substituted with an alkoxy group having 1 to 4 carbon atoms, or an alkenyl group having 3 to 5 carbon atoms. $R^{7E}$ and $R^{8E}$ may be bound to each other to form an alkylene group having 3 to 7 carbon atoms, and the alkylene group may contain, in its alkylene chain, —O— or —N($R^{12}$)— wherein $R^{12}$ has the same meaning as defined above.

Examples of compounds included in the α-aminoketones include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)-butan-1-on. Irgacure series manufactured by Ciba Specialty Chemicals Inc., for example, IRGACURE 907, IRGACURE 369, AND IRGACURE 379 are available as commercial products, and these are compounds included in the α-aminoketones and can be preferably used in the invention.

The compounds included in the acylphosphine oxides are preferably compounds represented by the formula (2) or (3).

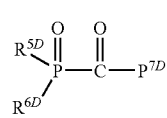

In the formula (2), $R^{5D}$ and $R^{6D}$ independently represent an aliphatic group, an aromatic group, an aliphatic oxy group, an aromatic oxy group, or a heterocyclic group, and $R^{7D}$ represents an aliphatic group, an aromatic group, or an heterocyclic group.

The aliphatic group represented by $R^{5D}$, $R^{6D}$ or $R^{7D}$ includes, for example, an alkyl group, a substituted alkyl group, an alkenyl group, a substituted alkenyl group, an alkynyl group, a substituted alkynyl group, an aralkyl group and a substituted aralkyl group, and is preferably an alkyl group, a substituted alkyl group, an alkenyl group, a substituted alkenyl group, an aralkyl group or a substituted aralkyl group, more preferably an alkyl group or an substituted alkyl group. The aliphatic group may be a cyclic aliphatic group or a linear aliphatic group. The cyclic aliphatic group may be branched.

The alkyl group includes a linear, branched or cyclic alkyl group, and the number of carbon atoms in the alkyl group is preferably 1 to 30, more preferably 1 to 20. The number of carbon atoms in the alkyl moiety of the substituted alkyl group is also preferably in the same range as defined in the alkyl group. The alkyl group may be either a substituted alkyl group or an unsubstituted alkyl group. The alkyl group includes a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, a cyclopentyl group, a neopentyl group, an isopropyl group, and an isobutyl group.

The substituent group on the substituted alkyl group includes a carboxyl group, a sulfo group, a cyno group, a halogen atom (for example, a fluorine atom, chlorine atom and bromine atom), a hydroxyl group, an alkoxycarbonyl group having 30 or less carbon atoms (for example, a methoxycarbonyl group, ethoxycarbonyl group, benzyloxycarbonyl group), an alkylsulfonylaminocarbonyl group having 30 or less carbon atoms, an arylsulfonylaminocarbonyl group, an alkylsulfonyl group, arylsulfonyl group, an acylaminosulfonyl group having 30 or less carbon atoms, an alkoxy group having 30 or less carbon atoms (for example, a methoxy group, ethoxy group, benzyloxy group, phenoxyethoxy group, phenethyloxy group etc.), an alkylthio group having 30 or less carbon atoms (for example, a methylthio group, ethylthio group, methylthioethylthioethyl group etc.), an aryloxy group having 30 or less carbon atoms (for example, a phenoxy group, p-tolyloxy group, 1-naphthoxy group, 2-naphthoxy group etc.), a nitro group, an alkyl group having 30 or less carbon atoms, an alkoxycarbonyloxy group, an aryloxycarbonyloxy group, an acyloxy group having 30 or less carbon atoms (for example, an acetyloxy group, propionyloxy group etc.), an acyl group having 30 or less carbon atoms (for example, an acetyl group, propionyl group, benzoyl group etc.), a carbamoyl group (for example, a carbamoyl group, N,N-dimethylcarbamoyl group, morpholinocarbonyl group, piperidinocarbonyl group etc.), a sulfamoyl group (for example, a sulfamoyl group, N,N-dimethylsulfamoyl group, morpholinosulfonyl group, piperidinosulfonyl group etc.), an aryl group having 30 or less carbon atoms (for example, a phenyl group, 4-chlorophenyl group, 4-methylphenyl group, α-naphthyl group etc.), a substituted amino group (for example, an amino group, alkylamino group, dialkylamino group, arylamino group, diarylamino group, acylamino group etc.), a substituted ureido group, a substituted phosphono group, a heterocyclic group etc. The carboxyl group, sulfo group, hydroxy group or phosphono group may be in the form of a salt. The cation forming the salt includes $M^+$ etc. described later.

The alkenyl group includes a linear, branched or cyclic alkenyl group, and the number of carbon atoms in the alkenyl group is preferably 2 to 30, more preferably 2 to 20. The alkenyl group may be a substituted alkenyl group having a substituent group or an unsubstituted alkenyl group, and the number of carbon atoms in the alkenyl moiety of the substituted alkenyl group is also preferably in the same range as defined in the alkenyl group. The substituent group on the substituted alkenyl group includes the same substituent group as defined above in the substituted alkyl group.

The alkynyl group includes a linear, branched or cyclic alkynyl group, and the number of carbon groups in the alkynyl group is preferably 2 to 30, more preferably 2 to 20. The alkynyl group may be a substituted alkynyl group having a substituent group or an unsubstituted alkynyl group, and the number of carbon atoms in the alkynyl moiety of the substituted alkynyl group is also preferably in the same range as defined in the alkynyl group. The substituent group on the substituted alkynyl group includes the same substituent group as defined above in the substituted alkyl group.

The aralkyl group includes a linear, branched or cyclic aralkyl group, and the number of carbon atoms in the aralkyl group is preferably 7 to 35, more preferably 7 to 25. The aralkyl group may be a substituted aralkyl group having a substituted group or an unsubstituted aralkyl group, and the number of carbon atoms in the aralkyl moiety of the substituted aralkyl group is also preferably in the same range as defined in the aralkyl group. The substituent group on the substituted aralkyl group includes the same substituent group as defined above in the substituted alkyl group.

The aromatic group represented by $R^{5D}$, $R^{6D}$ or $R^{7D}$ includes, for example, an aryl group and a substituted aryl group. The number of carbon atoms in the aryl group is preferably 6 to 30, more preferably 6 to 20. The number of carbon atoms in the aryl moiety of the substituted aryl group is also preferably in the same range as defined in the aryl group. The aryl group includes, for example, a phenyl group, α-naphthyl group, β-naphthyl group etc. The substituent group on the substituted aryl group includes the same substituent group as defined above in the substituted alkyl group.

The aliphatic oxy group represented by $R^{5D}$ or $R^{6D}$ is preferably an alkoxy group having 1 to 30 carbon atoms, such as a methoxy group, an ethoxy group, a butoxy group, an octyloxy group, a phenoxyethoxy group or the like. However, the invention is not limited thereto.

The aromatic oxy group represented by $R^{5D}$ or $R^{6D}$ is preferably an aryloxy group having 6 to 30 carbon atoms, such as a phenoxy group, a methylphenyloxy group, a chlorophenyloxy group, a methoxyphenyloxy group, an octyloxyphenyloxy group or the like. However, the invention is not limited thereto.

The heterocyclic group represented by $R^{5D}$, $R^{6D}$ or $R^{7D}$ is preferably a heterocyclic group containing an N, O or S atom, such as a pyridyl group, a furyl group, a thienyl group, an imidazolyl group, a pyrrolyl group or the like.

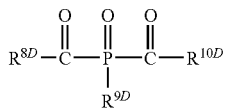

(3)

In the formula (3), $R^{8D}$ and $R^{10D}$ independently represent an alkyl group, an aryl group or a heterocyclic group, and $R^{9D}$ represents an alkyl group, an aryl group, an alkoxy group, an aryloxy group or a heterocyclic group. The alkyl group, aryl group, heterocyclic group, alkoxy group or aryloxy group represented by $R^{8D}$, $R^{9D}$ or $R^{10D}$ may have a substituent, and the substituent includes the same substituents as in the formula (2).

The alkyl group, aryl group, heterocyclic group, alkoxy group and aryloxy group in the formula (3) are the same as in the formula (2).

In the exemplary compounds described above, for example, [2,4,6-trimethylbenzoyl-diphenyl-phosphine oxide] is available under the trade name DAROCUR TPO (manufactured by Ciba Specialty Chemicals Inc.), and [bis (2,4,6-trimethylbenzoyl)-phenylphospine oxide] is available under the trade name IRGACURE 819 (manufactured by Ciba Specialty Chemicals Inc.).

The content of the polymerization initiator in the aqueous ink composition of the invention, in terms of solid content, is preferably in the range of 0.1 to 30% by weight, more preferably in the range of 0.2 to 20% by weight.

The aqueous ink composition of the invention more preferably uses a water-soluble acylphosphine oxide. The acylphosphine oxide is dissolved in an amount of preferably 0.5 wt % or more, more preferably 1 wt % or more, still more preferably 3 wt % or more, in distilled water at 25° C. Such water-soluble acylphosphine oxides include, for example, those compounds (for example, Exemplary Compounds 5, 6 and 7) described in JP-A No. 2005-307199.

Preferable examples of the water-soluble acylphosphine oxides include, but are not limited to, the following compounds:

Exemplary Compound 1-1

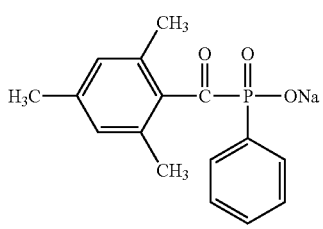

Exemplary Compound 1-2

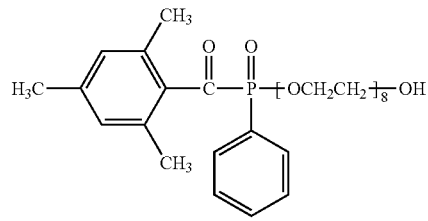

Exemplary Compound 1-3

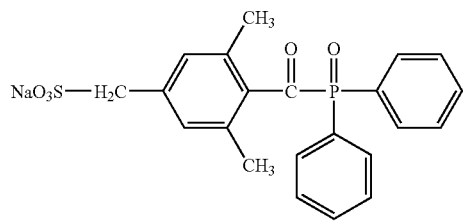

[Other Polymerization Initiator]

The polymerization initiator in the aqueous ink composition of the invention is preferably the acylphosphine oxide, but another polymerization initiator may be used as long as the effect of the invention is not impaired. Another polymerization initiator may be used in combination with the acylphosphine oxide. In this case, a water-soluble polymerization initiator is preferably used. The water-soluble polymerization initiator is dissolved in an amount of preferably 0.5 wt % or more, more preferably 1 wt % or more, still more preferably 3 wt % or more, in distilled water at 25° C.

Other known polymerization initiators that can be used in the invention include camphor quinone, benzophenone, benzophenone derivatives, acetophenone, acetophenone derivatives, for example, α-hydroxycycloalkyl phenyl ketones, 2-hydroxy-2-methyl-1-phenyl-propanone, dialkoxyacetophenones, α-hydroxy- or 4-aroyl-1,3-dioxolanes and benzoin alkyl ethers, benzyl ketals, for example, benzyl dimethyl ketal, phenyl glyoxalate and derivatives thereof, dimer phenyl glyoxalate, peresters, for example, benzophenone tetracarboxylic acid peresters (described in, for example, EP 1 126, 541), halomethyl triazines, for example, 2-[2-(4-methoxyphenyl)-vinyl]-4,6-bis-trichloromethyl[1,3,5]triazine, 2-(4-methoxy-phenyl)-4,6-bis-trichloromethyl[1,3,5]triazine, 2-(3,4-dimethoxy-phenyl)-4,6-bis-trichloromethyl[1,3,5]triazine, 2-methyl-4,6-bis-trichloromethyl[1,3,5]triazine, hexaaryl bisimidazole/co-initiator systems, for example, o-chlorohexaphenyl-bisimidazole combined with 2-mercaptobenzothiazole; ferrocenium compounds or titanocenes, for example, dicyclopentadienyl-bis(2,6-difluoro-3-pyrrolophenyl) titanium; for example, mixtures with O-acyloxime ester compounds as described in GB 2,339,571. As the co-initiator, boric acid compounds can also be used.

The content of the polymerization initiator (C) in the aqueous ink composition of the invention is preferably in the range of 0.01 to 35 parts by weight, more preferably 0.1 to 30 parts by weight, still more preferably 0.5 to 30 parts by weight, based on 100 parts by weight of the ethylenically unsaturated bond-containing water-soluble polymerizable compound (B). Herein, the content of the polymerization initiator means the total content of the polymerization initiator.

<(B) Ethylenically Unsaturated Double Bond-containing Water-soluble Polymerizable Compound>

The ink composition of the invention contains (B) an ethylenically unsaturated bond-containing water-soluble polymerizable compound (also referred to hereinafter as specific polymerizable compound). The specific polymerizable compound may be any water-soluble compound having, in its molecule, one radial-polymerizable ethylenically unsaturated bond, and includes those compounds having chemical forms such as monomers, oligomers and polymers. The specific polymerizable compounds may be used alone or in combination of two or more thereof in an arbitrary ratio to improve intended characteristics. Preferably, two or more of the specific polymerizable compounds are simultaneously used to regulate performance such as reactivity and physical properties.

The specific polymerizable compound used in the invention is dissolved in distilled water at room temperature in an amount of at least 2 wt % or more, preferably 15 wt % or more, and is particularly preferably one mixable uniformly with water at an arbitrary ratio.

Examples of the specific polymerizable compound include unsaturated carboxylic acids such as acrylic acid, methacrylic acid, itaconic acid, crotonic acid, isocrotonic acid and maleic acid, esters thereof and salts thereof, anhydrides having an ethylenically unsaturated group, acrylonitrile, styrene, various unsaturated polyesters, unsaturated polyethers, unsaturated polyamides, unsaturated urethanes, vinyl ethers, and allyl ethers, among which acrylic acid, methacrylic acid, esters thereof and salts thereof are preferable.

For conferring water solubility, the specific polymerizable compound used in the invention preferably has a poly(ethyleneoxy) chain, a poly(propyleneoxy) chain, or an ionic group (for example, a carboxyl group, a sulfo group etc.). When the specific polymerizable compound has a poly(ethyleneoxy) chain or a poly(propyleneoxy) chain, the number of ethyleneoxy or propyleneoxy units is preferably in the range of 1 to 10, more preferably in the range of 1 to 5. When the chain is long, water solubility is obtained, but a coating upon curing is poor in hardness, adhesion to a recording medium, etc.

In order to further improve sensitivity, to lower bleeding and to improve adhesiveness to a recording medium, a monoacrylate and a multifunctional acrylate monomer or oligomer having a molecular weight of 400 or more, preferably 500 or more, are used preferably as the radical polymerizable compound. Particularly in the ink composition used in recording on a flexible recording medium such as a PET film or PP film, a monoacrylate selected from the compound group described above, and a multifunctional acrylate monomer or a multifunctional acrylate oligomer, are preferably simultaneously used to impart flexibility to a film, to improve adhesiveness to a film, and to increase film strength.

From the viewpoint of maintaining safety, further improving sensitivity, lowering bleeding and improving adhesiveness to a recording medium, it is in a preferable aspect that at least three kinds of polymerizing compounds that are a monofunctional monomer, a bifunctional monomer and a trifunctional or more (multifunctional) monomer are simultaneously used.

Particularly preferable examples of the specific polymerizable compound include, for example, compounds having the following structures, but the specific polymerizable compound used in the invention is not limited thereto.

Exemplary Compound 2-1

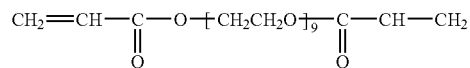

Exemplary Compound 2-2

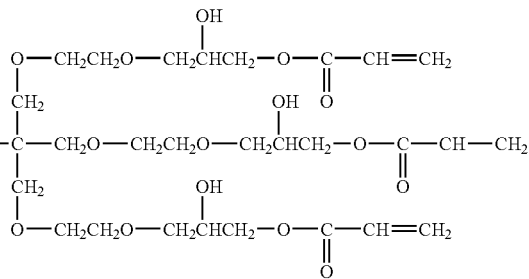

Exemplary Compound 2-3

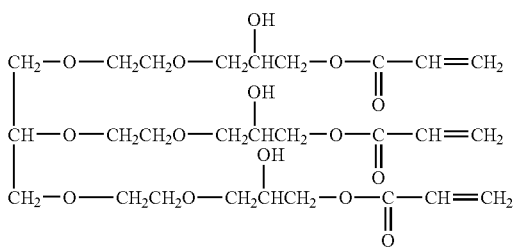

Exemplary Compound 2-4

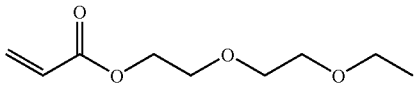

Compounds having an ionic group, such as methacrylic acid and potassium 3-sulfopropylacrylate, are also preferably used in addition to the exemplary compounds.

<(D) Water>

In the aqueous ink composition of the invention, water used as a main solvent is preferably ionic impurity-free water such as deionized water, distilled water or the like. The content of water in the ink composition of the invention is selected appropriately depending on the object and is usually preferably 10 to 95% by weight, more preferably 30 to 90% by weight.

<(E) Colorant>

In the invention, a curable colored radiation-curing aqueous ink composition can be obtained by adding the colorant (E) and can be applied to an inkjet recording system compatible with multicolor, to form multicolor images. A fundamental factor of the colorant that can be preferably used in the radiation-curing aqueous ink composition is that the colorant preferably satisfies compatibility with the ethylenically unsaturated bond-containing water-soluble polymerizable compound (B) and the polymerization initiator (D) in order to cure the aqueous ink composition by irradiation with a radiation. Specifically, an aqueous pigment dispersion or an aqueous dye such as one having an anionic dissociable group is more preferably used.

(Anionic Aqueous Pigment Dispersion)

Black pigments include, for example, carbon black. As carbon black, it is preferable to use carbon black manufactured by a furnace method or a channel method and having, as characteristics, a primary particle size of 15 to 40 μm, a specific surface area of 50 to 300 $m^2/g$ as determined by the BET method, a DBP oil absorption of 40 to 150 ml/100 g, a volatile matter content of 0.5 to 10% by weight, and a pH value of 2 to 9. Commercial products having such characteristics include, for example, No. 2300, No. 900, MCF88, No. 33, No. 40, No. 52, MA7, MA8, and No. 2200B (all manufactured by Mitsubishi Chemical Corporation), RAVEN 1255 (manufactured by Colombian Carbon), REGAL 400R, REGAL 330R, REGAL 660R, and MOGUL L (all manufactured by Cabot Corporation), and COLOR BLACK FW1, COLOR BLACK FW18, COLOR BLACK S170, COLOR BLACK S150, PRINTEX 35, AND PRINTEX U (all manufactured by Degussa Corporation), all of which can be preferably used.

Yellow pigments include, for example, Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 55, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 109, Pigment Yellow 110, Pigment Yellow 114, Pigment Yellow 128, Pigment Yellow 138, Pigment Yellow 139, Pigment Yellow 150, Pigment Yellow 151, Pigment Yellow 154, Pigment Yellow 155, and Pigment Yellow 180.

Magenta pigments include, for example, Pigment Red 5, Pigment Red 7, Pigment Red 12, Pigment Red 48 (Ca), Pigment Red 48 (Mn), Pigment Red 57:1, Pigment Red 57 (Sr), Pigment Red 57:2, Pigment Red 122, Pigment Red 123, Pigment Red 168, Pigment Red 184, Pigment Red 202, and Pigment Red 238.

Cyan pigments include, for example, Pigment Blue 1, Pigment Blue 2, Pigment Blue 3, Pigment Blue 16, Pigment Blue 22, Pigment Blue 60, Pigment Blue 15:2, Pigment Blue 15:3, Vat Blue 4, and Vat Blue 60.

The average particle size of the pigment particles is preferably in the range of about 25 nm to 200 nm. This range is sufficiently lower than the wavelength of visible light, so that when scattering is low, printed material said to be sufficiently transparent, although depending on the intended use of the printed material, can be obtained.

(Anionic Aqueous Dye)

The composition using a dye as the colorant, unlike the composition using the above pigment, is hardly usable in a state completely free from fading arising from irradiation with a radiation and is accompanied by fading to some degree. From this reason, when a dye is used as the colorant of ink, a so-called azo-containing metal dye that has formed a complex with a metal ion is preferably used because of less fading. However, when the level of fading is not brought into question, even a general water-soluble dye can be used in the aqueous ink composition of the invention.

As black dyes, it is possible to preferably use monoazo or disazo complexes coordinated with polyvalent metals such as Cr, Cu, Mn, Al, Zn and Fe, and non-complex azo black dyes such as Direct Black 17, Direct Black 19, Direct Black 51, Direct Black 154, Direct Black 174, and Direct Black 195.

Yellow dyes include, for example, Acid Yellow 11, Acid Yellow 17, Acid Yellow 23, Acid Yellow 25, Acid Yellow 29, Acid Yellow 42, Acid Yellow 49, Acid Yellow 61, Acid Yellow 71, Direct Yellow 12, Direct Yellow 24, Direct Yellow 26, Direct Yellow 44, Direct Yellow 86, Direct Yellow 87, Direct Yellow 98, Direct Yellow 100, Direct Yellow 130, Direct Yellow 132, and Direct Yellow 142.

Magenta dyes include, for example, Acid Red 1, Acid Red 6, Acid Red 8, Acid Red 32, Acid Red 35, Acid Red 37, Acid Red 51, Acid Red 52, Acid Red 80, Acid Red 85, Acid Red 87, Acid Red 92, Acid Red 94, Acid Red 115, Acid Red 180, Acid Red 254, Acid Red 256, Acid Red 289, Acid Red 315, Acid Red 317, Direct Red 1, Direct Red 4, Direct Red 13, Direct Red 17, Direct Red 23, Direct Red 28, Direct Red 31, Direct Red 62, Direct Red 79, Direct Red 81, Direct Red 83, Direct Red 89, Direct Red 227, Direct Red 240, Direct Red 242, and Direct Red 243.

Cyan dyes include, for example, Acid Blue 9, Acid Blue 22, Acid Blue 40, Acid Blue 59, Acid Blue 93, Acid Blue 102, Acid Blue 104, Acid Blue 113, Acid Blue 117, Acid Blue 120, Acid Blue 167, Acid Blue 229, Acid Blue 234, Acid Blue 254, Direct Blue 6, Direct Blue 22, Direct Blue 25, Direct Blue 71, Direct Blue 78, Direct Blue 86, Direct Blue 90, Direct Blue 106, and Direct Blue 199.

The concentration of the dye in the aqueous ink composition is preferably in the range of 0.1 to 10% by weight based on the total amount of the aqueous ink composition. When the concentration is low, the dye can be applied preferably to light-colored inks among density modulating inks.

Hereinafter, the components which can be used as necessary in the aqueous ink composition of the invention will be described.

<Solvent Component>

Preferably, a solvent component is added in a certain amount to the radiation-curing aqueous ink composition of the invention. By using the solvent component, the aqueous ink composition can be made nonvolatile, can reduce its viscosity, and can give wettability to a recording medium.

The solvent component keeps the dispersion stability of the pigment, which is not only effective for the conventional effect of preventing the aqueous ink from adhering to nozzles, but also effective in reducing curing shrinkage in a system at high polymerization rate wherein the specific polymerizable compound having high reactivity to increase crosslinking density and the polymerization initiator having high initiation efficiency are combined and used as in the radiation-curing aqueous ink composition of the invention.

When the polymerization proceeds to a certain extent in such system, the diffusion of the polymerizable compound and polymerization initiator is suppressed so that the final curing degree may not increase, against which the solvent component also effectively acts.

Printed materials by the inkjet recording system are often appreciated by being taken up by the general public, and it is thus important that the printed materials have a cured film of sufficient strength and flexibility formed thereon, thereby attaining such toughness as not to permit the film to be removed from the recording medium.

The solvent is preferably selected from glycerin, ethylene glycol, diethylene glycol, and a mixture thereof, all of which have achieved satisfactory results in inkjet recording performance. The solvent is contained usually in an amount of 0.5 to 5% by weight based on the total amount of the aqueous ink composition.

<Reactive Diluent Component>

Water is mainly used as the solvent for diluting the specific polymerizable compound and the water-soluble polymerization initiator in the invention, and in addition to water, water-soluble and polymerizable low-viscosity monomers can be used. The advantage of using not usual solvent but such compounds is that these compounds do not remain as plasticizers in solids after radiation curing, thus reducing their influence on the physical properties of the solids.

The reactive diluent component selected for this purpose includes compounds such as acryloyl morpholine, N-vinyl-2-pyrrolidone, N-vinylformamide, acrylamide, methylenebisacrylamide, monosaccharide monoacrylates, oligoethylene oxide monoacrylates, and dibasic acid monoacrylates.

<Additives>

In the invention, arbitrary additives besides the compounds described above may contained in the radiation-curing aqueous ink composition. Examples of such additives include a pH regulator, a leveling agent, a viscosity regulator, an antioxidant, a hindered amine light stabilizer (HALS), a preservative, an antifungal agent etc. When such additives are used, they are contained usually in an amount of 0.1 to 5% by weight based on the total amount of the aqueous ink composition.

<Formulation for Clear Aqueous Ink Composition>

The radiation-curing aqueous ink composition of the invention, when prepared in a clear form without incorporating the colorant described above, can be used in applications to an undercoat for conferring image printing performance on a recording medium or to an overcoat intended to protect the surface of an image formed from usual ink or to give decoration or gloss on the surface. In the aqueous clear ink composition, colorless pigments and fine particles not intended to color the composition can be dispersed and contained. By adding them to either an undercoat or an overcoat, various properties of printed material, such as image qualities, fastness, and performance (handleability) can be improved.

For application to such clear aqueous ink composition, the content of the specific polymerizable compound is preferably 10 to 70% by weight based on the total amount of the aqueous ink composition. The ink composition is preferably prepared such that the polymerization initiator is contained in an amount of 1 to 10 parts by weight relative to 100 parts by weight of the specific polymerizable compound, and simultaneously the polymerization initiator is contained in an amount of 0.5 part by weight or more relative to 100 parts of the aqueous ink composition.

<Constitution and Physical Properties of the Materials in the Colorant-containing Aqueous Ink Composition>

When a colorant, for example, a pigment is used in the radiation-curing aqueous ink composition of the invention, the net content of the pigment (that is, a content excluding the content of a surface treatment agent and a dispersant) in the aqueous ink composition is generally preferably in the range of 0.3 to 10% by weight based on the total amount of the aqueous ink composition. The pigment when used in the range of about 0.3 to 1% is in such a range to be usable as light-colored ink although the tinting power of the pigment depends on the dispersed state of pigment particles. The pigment when used in a higher amount than this range gives density for use in general coloring.

As another compounding amount, the amount of water is preferably in the range of 40 to 90% by weight, more preferably in the range of 60 to 75% by weight, based on the total amount of the aqueous ink composition. The content of the specific polymerizable compound in the aqueous ink composition is preferably in the range of 1 to 30% by weight, more preferably in the range of 5 to 20% by weight, based on the total amount of the aqueous ink composition. The content of the polymerization initiator, although varying depending on the content of the specific polymerizable compound, is generally preferably in the range of 0.1 to 7% by weight, more preferably 0.3 to 5% by weight, based on the total amount of the aqueous ink composition.

When the radiation-curing aqueous ink composition of the invention is applied to the inkjet recording system, the viscosity of the composition is preferably in the range of 5 mPa·s to 15 mPa·s. In the case of the inkjet recording system provided with fine high-density high-drive-wavelength nozzles, the upper limit of the viscosity is preferably 10 mPa·s.

The surface tension of the composition is preferably in the range of 35 mN/m (dyne/cm) to 50 mN/m, in consideration of printing on plain paper. A usual aqueous inkjet ink is regulated to have surface tension as low as about 30 mN/m to allow the ink to penetrate rapidly into paper thereby preventing a bleeding phenomenon, which is however accompanied by a decrease in image density. The radiation-curing aqueous ink composition of the invention, on the other hand, can be cured to prevent the ink composition from flowing, and therefore, the surface tension can be increased so that ink droplets are retained as much as possible in the surface layer of a recording medium, thereby permitting both bleeding and image density to be simultaneously satisfied.

For securing image density, a recording medium should be wetted to a certain extent with ink droplets at the time of irradiation with a radiation, and thus the upper limit of the surface tension is more preferably about 50 mN/m.

<Inkjet Recording Method>

Hereinafter, the inkjet recording method for applying the radiation-curing aqueous ink composition as described above, onto a recording medium, by an inkjet system and curing it by irradiation with a radiation will be described.

[Printer System]

The radiation-curing aqueous ink composition of the invention is preferably used in a head in an inkjet jetting system and is effectively used either in an ink reservoir in which the aqueous ink composition is stored or as an ink to be charged into the reservoir. Particularly, the invention brings about an excellent effect in a recording head or a recording apparatus in the Bubble Jet (registered trade mark) system among inkjet recording systems.

With respect to its typical constitution and principle, the basic principle disclosed in, for example, U.S. Pat. Nos. 4,723,129 and 4,740,796 is preferably used. This system can be applied to both an on-demand system and a continuous system. Particularly, the on-demand system is effective because at least one driving signal corresponding to recording information and giving a rapid increase in temperature higher than in nucleate boiling is applied to an electricity/heat converter arranged to correspond to a sheet or a pass for holding ink, thereby allowing the electricity/heat converter to generate heat energy, thereby causing film boiling in the thermal action surface of a recording head, resulting in formation of a bubble in ink corresponding one-on-one to the driving signal. By growth and shrinkage of this bubble, the ink is jetted via a jetting opening to form at least one droplet. This driving signal is particularly preferably in pulse shape so that growth and shrinkage of bubbles are immediately and appropriately carried out, thus achieving ink jetting excellent particularly in response. This driving signal in pulse shape is preferably those described in U.S. Pat. Nos. 4,463,359 and 4,345,262. When the conditions described in U.S. Pat. No. 4,313,124 directed to an invention concerning the rate of temperature rise on the thermal action surface are used, further excellent recording can be carried out.

With respect to the constitution of the recording head, the invention is not only effective in the constitution using U.S. Pat. Nos. 4,558,333 and 4,459,600 that disclose a constitution wherein a thermal action portion is arranged on a bent region, besides a combined constitution (a linear fluid pass or a right-angled fluid pass) of a jetting opening, a pass and an electricity/heat converter as disclosed in the specifications mentioned above, but is also effective in the jetting system in an air-communicating system described in Japanese Patent No. 2962880, Japanese Patent No. 3246949, and JP-A No. 11-188870. In addition, the invention is also effective in the constitution wherein a plurality of electricity/heat converters have a common jetting opening as the jetting portion of the electricity/heat converters (JP-A No. 59-123670 etc.). The invention can exhibit the above-described effect more effectively either on the constitution of one integrally formed recording head or on the constitution wherein a plurality of recording heads, as disclosed in the above-mentioned specifications, are combined as recording heads of full line type having length corresponding to the width of the maximum recording medium that can be recorded with a recording apparatus, thereby satisfying the length.

In addition, the invention is effective where an exchangeable recording head of chip type, which can be fit to the main body of the apparatus thereby enabling not only electrical connection to the main body of the apparatus but also feeding of ink from the main body of the apparatus, or a recording head of cartridge type which is formed integrally with the recording head itself, is used. The addition, to the recording head, of a recovery unit and a preliminary auxiliary unit arranged as the constitution of the recording apparatus to which the invention is applied is preferable because the effect of the invention can further be stabilized. Specific examples of these units include unit for the recording head, such as a capping unit, a cleaning unit, a pressurizing or suctioning unit, a heating element other than, or combined with, an electricity-heat converter, and a preliminary jetting aspect for carrying out jetting other than in recording.

As shown in the schematic diagram of the front of a printer in FIG. 1, the recording apparatus for carrying out the recording method of the invention is a recording apparatus including an ink tank 1 for accommodating the radiation-curing aqueous ink composition of the invention, a head 2 for actually effecting recording (in the diagram, a multi-head having a large number of heads arranged therein is used), lamps 3 for ultraviolet irradiation in curing, a drive part 4 for driving the head and lamps, a paper jetting portion 5 for delivering a recording medium to be recorded. The apparatus further includes a wiping part, a capping part, a paper feeder and a drive motor (not shown).

In the head 2 in FIG. 1, nozzles for jetting the radiation-curing aqueous ink composition are bilaterally symmetrically arranged for each color, and the head 2 and lamps 3 are scanned as a unit from side to side, thereby applying the radiation-curing aqueous ink composition onto a recording medium, and immediately thereafter, UV irradiation is carried out (the lamp will be described later in detail). Accordingly, when this recording apparatus is used, spreading of ink droplets in recording on plain paper, and bleeding between colors, can be prevented, and the inkjet recording method that realizes formation of images also excellent in fastness can be achieved.

In the ink tank 1, 4 colors of black (Bk), cyan (C), magenta (M) and yellow (Y) are arranged, but 6 colors, that is, the 4 colors plus light cyan (LC) and light magenta (LM) may be arranged for recording finer images. Because the response of black is inferior to other colors, 3 combined colors of cyan, magenta and yellow may be arranged to form process black. In the invention, the tank is preferably one capable of preventing light-transmittance.

Besides the recording system described above, the apparatus in the invention can be constituted appropriately as necessary such that a lamp is arranged on the front of the paper jetting portion, paper is fed or jetted by being wound on a rotating drum, or a drying portion is separately arranged.

<UV Irradiation Lamp>

Hereinafter, the UV irradiation lamp used preferably in curing the radiation-curing aqueous ink composition of the invention will be described. The UV irradiation lamp is preferably a low-pressure mercury lamp wherein the vapor pressure of mercury during light is 1 to 10 Pa, a high-pressure mercury lamp, or a mercury lamp coated with a fluorescent material. The emission spectrum in the UV region of these mercury lamps is 450 nm or less, particularly in the range of 184 nm to 450 nm, which is suitable for efficient reaction of the polymerizable compound in the black or colored aqueous ink composition. This also suitable because when the printer is loaded with a power source, a small power source can be used. Mercury lamps such as a metal halide lamp, a high-pressure mercury lamp, an ultrahigh-pressure mercury lamp, a xenon flash lamp, a deep UV lamp, a lamp that without electrodes, excites a mercury lamp by external microwaves, and a UV laser, have been practically used, and their emission wavelength range includes the above range, so that as long as the power-source size, input intensity, lamp shape, etc. are allowable, these lamps are fundamentally usable. The light source is selected in accordance with the sensitivity of the polymerization initiator used.

The necessary UV intensity is preferably 500 to 5000 mW/cm$^2$ in a wavelength range necessary for curing. When integrated intensity is low, formation of images having high qualities and fastness cannot be achieved. When radiation intensity is too strong, a recording medium may be damaged, and the coloring material may be faded.

-Second Aspect-

Hereinafter, the second aspect of the invention (also referred to hereinafter as the invention) will be described in detail with reference to preferable exemplary embodiments.

First, the features of the aqueous ink composition of the invention, and the action and effect of printing by the inkjet recording system as the main example to which the active ray-curing aqueous ink composition of the invention can be applied will be described.

The radiation usable in the invention includes ultraviolet rays and electron rays as described later in detail. The description which follows may proceed with reference to examples using particularly preferable ultraviolet rays. However, it is not thereby meant that the active energy ray applicable to the invention is limited to ultraviolet rays.

First, the constituent materials of the active energy ray-curing aqueous ink composition of the invention will be specifically described.

The ink composition of the invention contains (A) a sensitizing dye represented by the formula (i) (referred to hereinafter as specific sensitizing dye), (B) a polymerization initiator, (C) an ethylenically unsaturated bond-containing water-soluble polymerizable compound, and (D) water, wherein the polymerizable compound (C) is present in an emulsified state in the ink composition.

<(B) Polymerization Initiator>

The ink composition of the invention contains a polymerization initiator that is decomposed with an active radiation to generate a radical initiating polymerization of the polymerizable compound.

The polymerization initiator used in the invention can be selected appropriately from arbitrary compounds known generally as photopolymerization initiators, for example (i) aromatic ketones, (ii) aromatic onium salt compounds, (iii) organic peroxides, (iv) hexaarylbisimidazole compounds, (v) ketoxime ester compounds, (vi) borate compounds, (vii) azinium compounds, (viii) metallocene compounds, (ix) active ester compounds, and (x) compounds containing a carbon-halogen bond. From the viewpoint of curing sensitivity, the ink composition preferably contains at least one polymerization initiator selected from α-aminoketones and acylphosphine oxides, and particularly preferably contains both of α-aminoketones and acylphosphine oxides.

The α-aminoketone compound used preferably as the polymerization initiator in the invention includes the compounds represented by the formula (1) described in the first aspect. The definition of the compounds represented by the formula (1) and the preferable scope thereof are the same as described above. Examples of the compounds included in α-aminoketones include the compounds described in the first aspect.

The acylphosphine oxide compound used preferably as the polymerization initiator in the invention includes the compounds represented by the formula (2) or formula (3) described in the first aspect. The definition of the compounds represented by the formulae (2) and (3) and the preferable scope thereof are the same as described above.

The acylphosphine oxide compounds represented by the formula (2) or (3) include, for example, compounds described in Japanese Patent Application Publication (JP-B) Nos. 63-40799, 5-29234, JP-A Nos. 10-95788, and 10-29997.

Specific examples of the acylphosphine oxide compound include the following compounds (Exemplary Compounds (P-1) to (P-26)), but the invention is not limited thereto. Note that, in the exemplified compounds (P-1) to (P-26), n represents that the hydrocarbon is a normal structure and iso represents an isomer with respect to a normal structure.

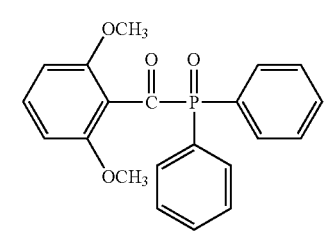
(P-1)

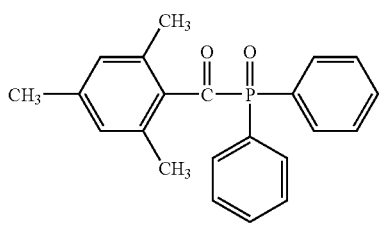
(P-2)

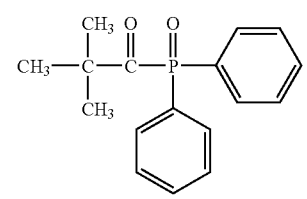
(P-3)

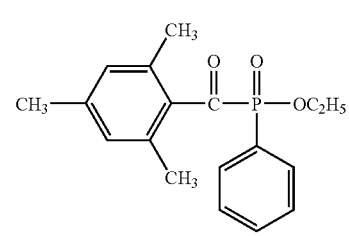
(P-4)

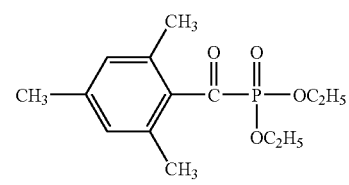
(P-5)

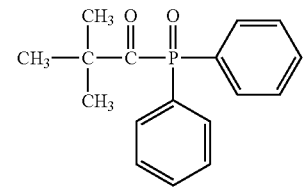
(P-6)

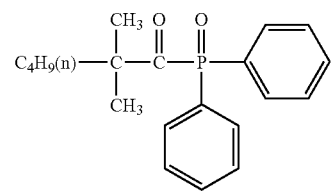
(P-7)

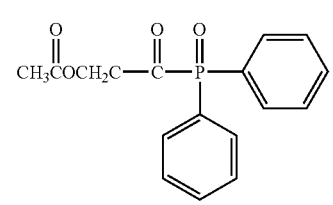
(P-8)

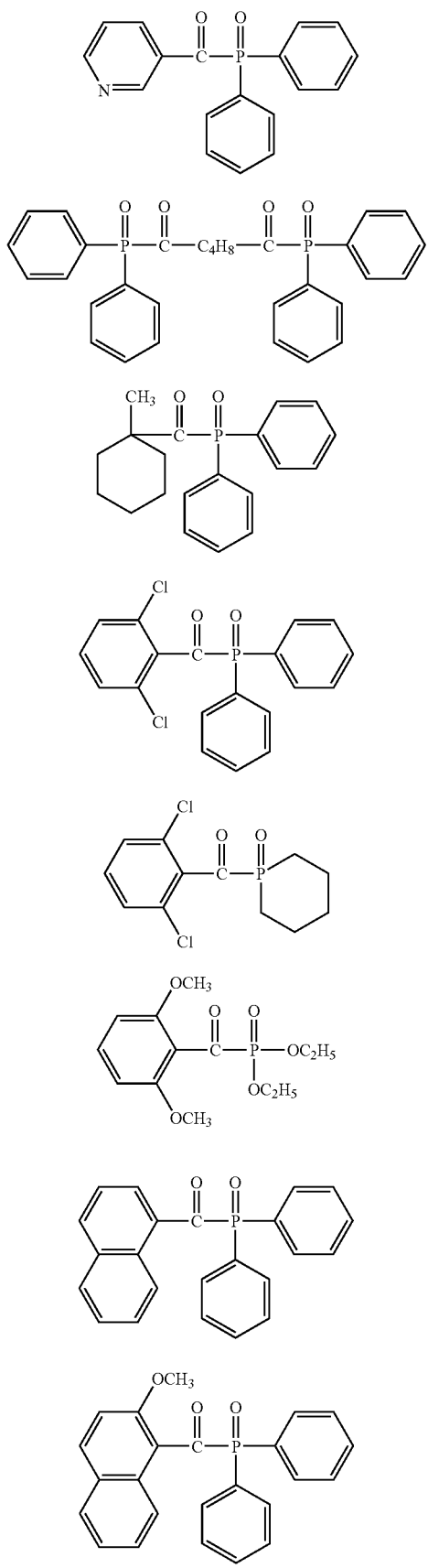
(P-9)
(P-10)
(P-11)
(P-12)
(P-13)
(P-14)
(P-15)
(P-16)
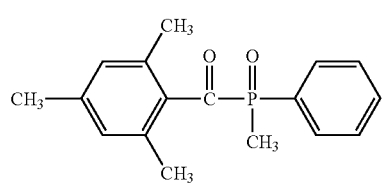
(P-17)
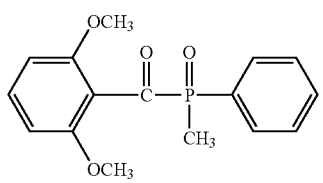
(P-18)
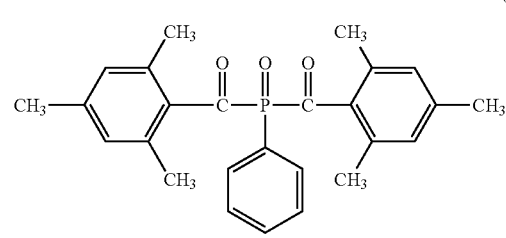
(P-19)
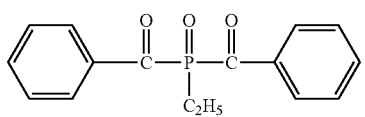
(P-20)
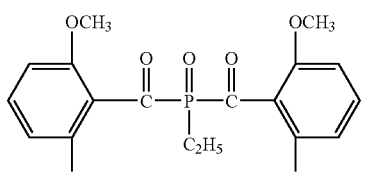
(P-21)
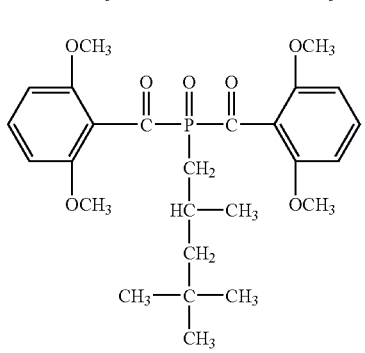
(P-22)
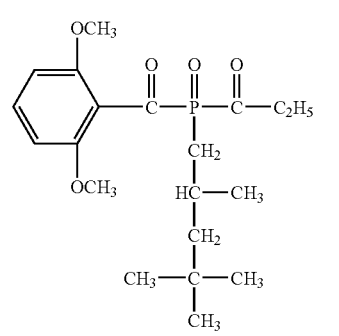
(P-23)

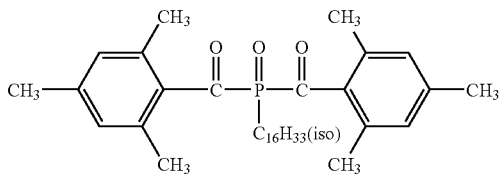
(P-24)

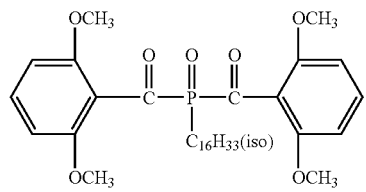
(P-25)

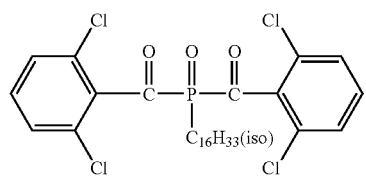
(P-26)

In the exemplary compounds mentioned above, for example, (P-2) [2,4,6-trimethylbenzoyl-diphenyl-phosphine oxide] is available under the trade name DAROCUR TPO (manufactured by Ciba Specialty Chemicals Inc.), and (P-19) [bis(2,4,6-trimethylbenzoyl)-phenylphospine oxide] is available under the trade name IRGACURE 819 (manufactured by Ciba Specialty Chemicals Inc.).

The content of the polymerization initiator (B) in the ink composition of the invention, in terms of solid content, is preferably in the range of 0.1 to 30% by weight, more preferably 0.2 to 20% by weight.

In the ink composition of the invention, the polymerizable compound (C) described later should be present as an emulsion in the ink composition, wherein the polymerization initiator (B) may be present in the same phase as that of the polymerizable compound (C) or may be present in the aqueous phase.

When the polymerization initiator (B) is allowed to be present in the aqueous phase, a water-soluble compound having, in its molecule, hydrophilic substituents such as a carboxyl group (including a salt thereof), a sulfo group (including a salt thereof), and an ethyleneoxy group may be selected and used as the polymerization initiator.

From the viewpoint of sensitivity, the polymerization initiator (B) is preferably present in the same phase as that of the polymerizable compound (C).

The ink composition of the invention preferably contains at least the specific polymerization initiator as a photopolymerization initiator, but a photopolymerization initiator other than the preferable specific polymerization initiator described above may be used in place of, or in addition to, the specific polymerization initiator.

As the other polymerization initiator, the compound mentioned as the "other known polymerization initiator" in the first aspect can be used.

The content of the polymerization initiator (B) in the ink composition of the invention is contained preferably in the range of 0.01 to 35 parts by weight, more preferably 0.1 to 30 parts by weight, even more preferably 0.5 to 30 parts by weight, based on 100 parts by weight of the ethylenically unsaturated bond-containing water-soluble polymerizable compound (C) described later. The content of the polymerization initiator means the total content of the polymerization initiators containing the preferable specific polymerization initiator and other polymerization initiators.

<Sensitizing Dye>

The ink composition of the invention contains a sensitizing dye for promoting decomposition of the polymerization initiator by irradiation with an active ray, and as the sensitizing dye, a compound represented by the following formula (i) is contained as an essential component.

[(A) Sensitizing Dye Represented by the Formula (i)]

The ink composition of the invention should contain at least one specific sensitizing dye belonging to the compounds represented by the following formula (i):

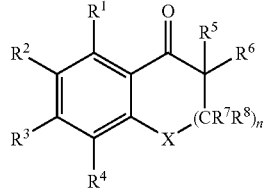
(i)

In the formula (i), X represents O, S or NR wherein R represents a hydrogen atom, an alkyl group or an acyl group. R is preferably an alkyl group or an acyl group. n is 0 or 1.

X is preferably O or S, more preferably S. When n is 0, a carbon atom bound to $R^7$ and $R^8$ ($CR^7R^8$) is not present, and heteroatom-containing X is bound directly to a carbon atom bound to $R^5$ and $R^6$ to constitute a 5-memberred heterocycle containing X.

$R^1$, $R^2$, $R^3$, $R^4$, $R^5$, $R^6$, $R^7$ and $R^8$ independently represent a hydrogen atom or a monovalent substituent.

When $R^1$, $R^2$, $R^3$, $R^4$, $R^5$, $R^6$, $R^7$ or $R^8$ represents a monovalent substituent, the monovalent substituent includes a halogen atom, an aliphatic group, an aromatic group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, a carboxyl group, and a sulfo group, among which an alkyl group, an alkoxy group and a halogen atom are preferable.

When $R^1$, $R^2$, $R^3$, $R^4$, $R^5$, $R^6$, $R^7$ or $R^8$ in the formula (i) represents an alkyl group as the monovalent substituent, the alkyl group is preferably an alkyl group having 1 to 10 carbon atoms, more preferably an alkyl group having 1 to 4 carbon atoms, such as a methyl group, an ethyl group, a propyl group, an n-butyl group, a sec-butyl group, a t-butyl group or the like.

When the monovalent substituent is an alkoxy group, the alkoxy group is preferably an alkoxy group having 1 to 4 carbon atoms, such as a methoxy group, an ethoxy group, a hydroxyethoxy group, a propoxy group, an n-butoxy group, an isobutoxy group, a sec-butoxy group, a t-butoxy group or the like.

The halogen atom includes a fluorine atom, a chlorine atom, a bromine atom and an iodine atom.

Neighboring two of $R^1$, $R^2$, $R^3$ and $R^4$ may be bound (e.g. condensed) to each other to form a ring.

When these groups form a ring, the ring structure includes a 5- to 6-memberred aliphatic or an aromatic ring, and may be a heterocycle containing an element other than carbon atoms, and the rings thus formed may further be combined to form a 2-nucleus ring, for example a condensed ring. These ring structures may further have each substituent group illustrated as the monovalent substituent represented by each of $R^1$ to $R^8$ in the formula (i). When the formed ring structure is a heterocycle, examples of the heteroatom the heterocycle include N, O and S.

When n=1, $R^5$ or $R^6$, and $R^7$ or $R^8$, may be bound to each other to form an aliphatic ring but do not form an aromatic ring. The aliphatic ring is preferably a 3- to 6-memberred ring, more preferably a 5- or 6-memberred ring.

The sensitizing dye which can be more preferably used in the invention includes sensitizing dyes represented by the following formula (iA):

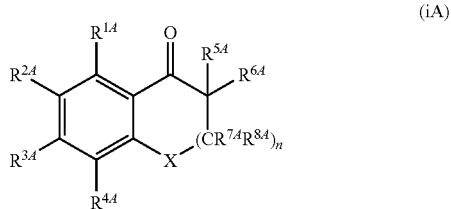

In the formula (iA), X represents O or S. n represents 0 or 1. $R^{1A}$, $R^{2A}$, $R^{3A}$, $R^{4A}$, $R^{5A}$, $R^{6A}$, $R^{7A}$ and $R^{8A}$ independently represent a hydrogen atom, an alkyl group, a halogen atom, a hydroxyl group, a cyano group, a nitro group, an amino group, an alkylthio group, an alkylamino group, an alkoxy group, an alkoxycarbonyl group, an acyloxy group, an acyl group, a carboxyl group or a sulfo group. Neighboring two of $R^{1A}$, $R^{2A}$, $R^{3A}$ and $R^{4A}$ may be bound (condensed) to each other to form a ring. $R^{5A}$ or $R^{6A}$, and $R^{7A}$ or $R^{8A}$, may be bound to each other to form an aliphatic ring but do not form an aromatic ring.

The sensitizing dye which can be further preferably used includes sensitizing dyes represented by the following formula (iB):

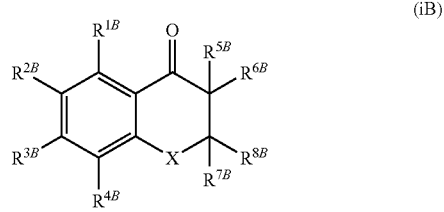

In the formula (iB), X represents O or S. $R^{1B}$, $R^{2B}$, $R^{3B}$, $R^{4B}$, $R^{5B}$, $R^{6B}$, $R^{7B}$ and $R^{8B}$ independently represent a hydrogen atom, an alkyl group, a halogen atom, a hydroxyl group, a cyano group, a nitro group, an amino group, an alkylthio group, an alkylamino group, an alkoxy group, an alkoxycarbonyl group, an acyloxy group, an acyl group, a carboxyl group or a sulfo group. Neighboring two of $R^{1B}$, $R^{2B}$, $R^{3B}$ and $R^{4B}$ may be bound (condensed) to each other to form a ring. $R^{5B}$ or $R^{6B}$, and $R^{7B}$ or $R^{8B}$, may be bound to each other to form an aliphatic ring but do not form an aromatic ring.

The sensitizing dye which can be further preferably used includes sensitizing dyes represented by the following formula (iC):

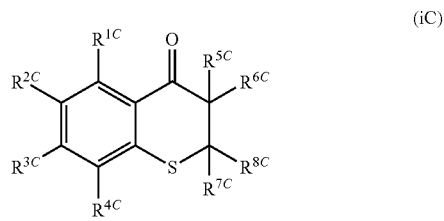

In the formula (iC), $R^{1C}$, $R^{2C}$, $R^{3C}$, $R^{4C}$, $R^{5C}$, $R^{6C}$, $R^{7C}$ and $R^{8C}$ independently represent a hydrogen atom, an alkyl group, a halogen atom, a hydroxyl group, a cyano group, a nitro group, an amino group, an alkylthio group, an alkylamino group, an alkoxy group, an alkoxycarbonyl group, an acyloxy group, an acyl group, a carboxyl group or a sulfo group.

Neighboring two of $R^{1C}$, $R^{2C}$, $R^{3C}$ and $R^{4C}$ may be bound to each other to form a 5- to 6-memberred aliphatic or an aromatic ring, which may be a heterocycle containing an element other than carbon atoms, and the rings thus formed may further be combined to form a 2-nucleus ring, for example a condensed ring. These ring structures may further have each substituent group illustrated as the monovalent substituent represented by each of $R^1$, $R^2$, $R^3$, $R^4$, $R^5$, $R^6$, $R^7$ and $R^8$ in the formula (i). When the ring structure is a heterocycle, examples of the heteroatom in the heteroatom include N, O and S. $R^{5C}$ or $R^{6C}$, and $R^{7C}$ or $R^{8C}$, may be bound to each other to form an aliphatic ring but do not form an aromatic ring.

At least one of $R^{1C}$, $R^{2C}$, $R^{3C}$, $R^{4C}$, $R^{5C}$, $R^{6C}$, $R^{7C}$ and $R^{8C}$ is preferably a halogen atom. More preferably, each of $R^{1C}$, $R^{2C}$, $R^{3C}$, and $R^{4C}$ is a halogen atom as the substituent, and most preferably $R^{2C}$ is a halogen atom. The number of halogen atoms is preferably 1 or 2, more preferably 1.

$R^{2C}$ is preferably a substituent other than hydrogen, more preferably an alkyl group, a halogen atom, an acyloxy group, or an alkoxycarbonyl group, among which an alkyl group and a halogen atom are preferable because of high sensitivity due to good matching with a light source.

Preferably, either of $R^{7C}$ or $R^{8C}$ is a substituent group other than hydrogen, and more preferably, both of them are substituent groups other than hydrogen. Preferable examples of the substituent group include an alkyl group, a halogen atom, a carboxyl group and an alkoxycarbonyl group, among which an alkyl group and an alkoxycarbonyl group are preferable, and an alkyl group is most preferable.

The halogen atom includes a fluorine atom, a chlorine atom, a bromine atom and an iodine atom, among which a chlorine atom, a bromine atom and an iodine atom are preferable.

When any one of $R^{1C}$, $R^{2C}$, $R^{3C}$, $R^{4C}$, $R^{5C}$, $R^{6C}$, $R^{7C}$ and $R^{8C}$ is an alkyl group, the alkyl group is preferably an alkyl group having 1 to 10 carbon atoms, more preferably an alkyl group having 1 to 4 carbon atoms, such as a methyl group, an ethyl group, a propyl group, an n-butyl group, a sec-butyl group, a t-butyl group or the like.

When any one of $R^{1C}$, $R^{2C}$, $R^{3C}$, $R^{4C}$, $R^{5C}$, $R^{6C}$, $R^{7C}$ and $R^{8C}$ is an acyloxy group, the acyloxy group is preferably an aliphatic acyloxy group having 2 to 10 carbon atoms, more preferably an aliphatic acyloxy group having 2 to 5 carbon atoms.

When any one of $R^{1C}$, $R^{2C}$, $R^{3C}$, $R^{4C}$, $R^{5C}$, $R^{6C}$, $R^{7C}$ and $R^{8C}$ is an alkoxycarbonyl group, the alkoxycarbonyl group is preferably an aliphatic alkoxycarbonyl group having 2 to 10 carbon atoms, more preferably an alkoxycarbonyl group having 2 to 5 carbon atoms.

Specific examples of the specific sensitizing dye [Exemplary Compounds (I-1) to (I-133)] which can be preferably used in the invention are shown below, but the invention is not limited thereto. In the exemplified compounds (I-1) to (I-133), Me represents methyl group, $Bu^t$ represents tertiary-butyl group and $Pr^i$ represents isopropyl group.

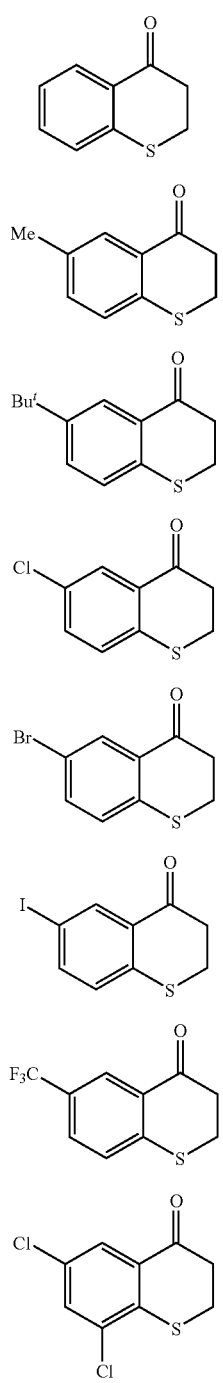

-continued

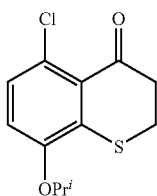
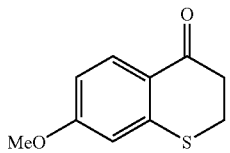
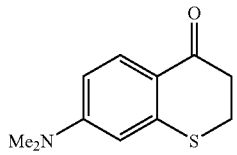
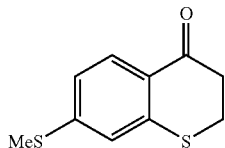
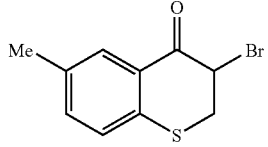
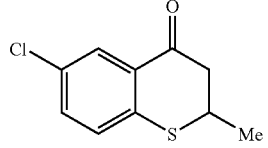
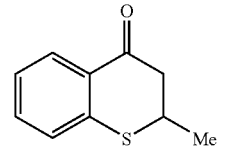
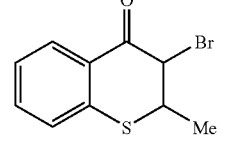
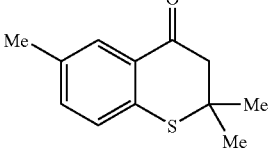

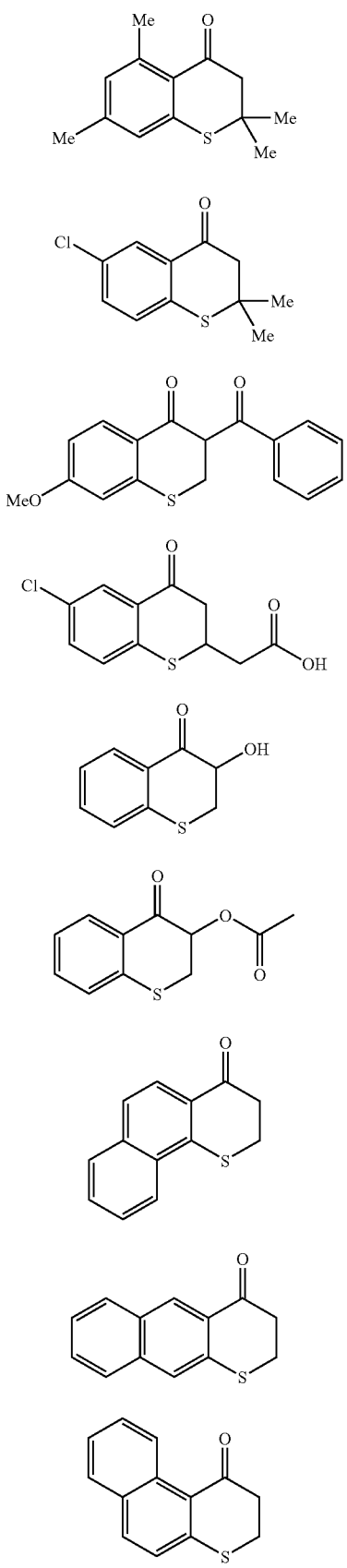
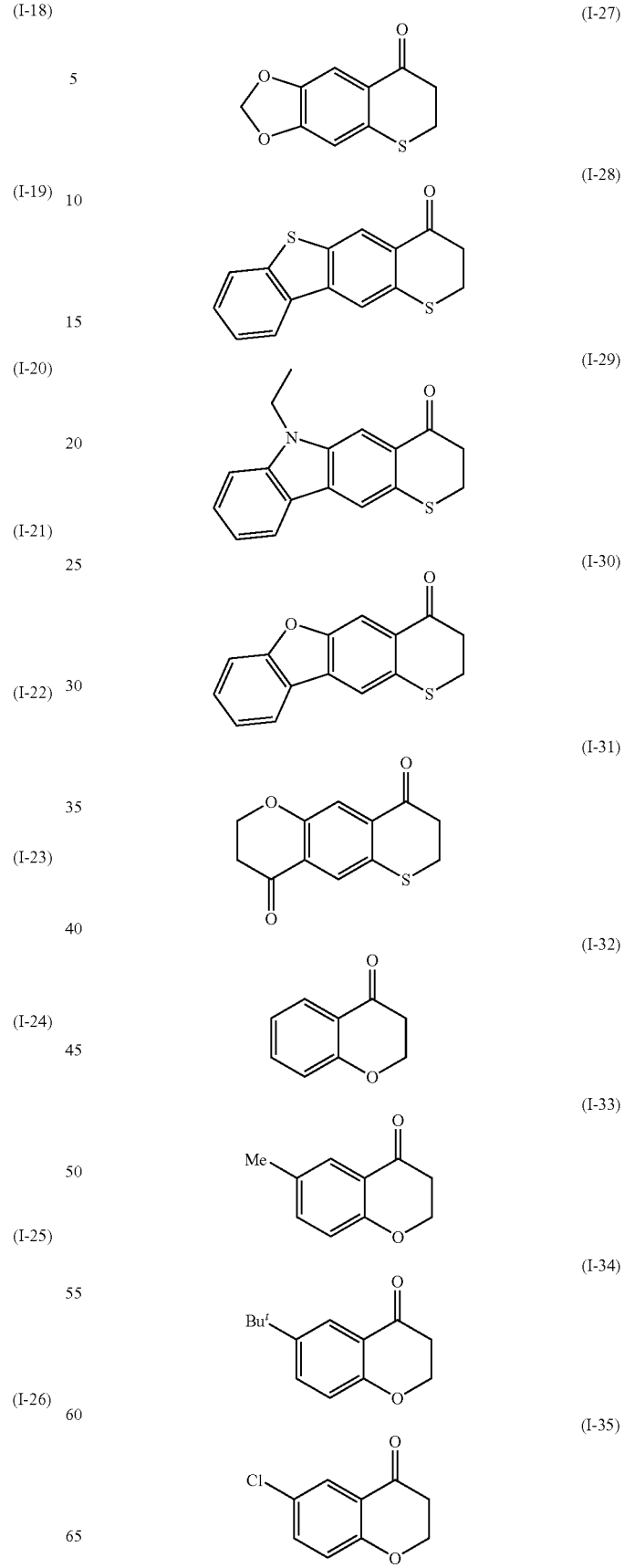

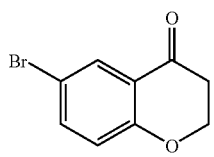 (I-36)
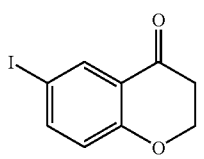 (I-37)
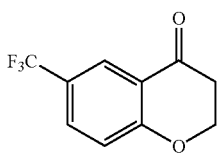 (I-38)
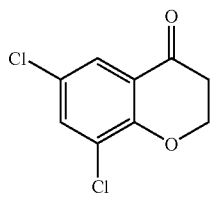 (I-39)
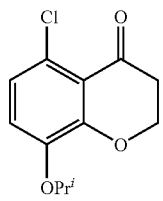 (I-40)
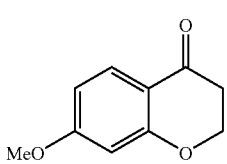 (I-41)
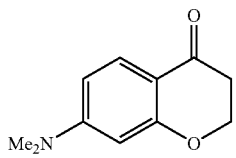 (I-42)
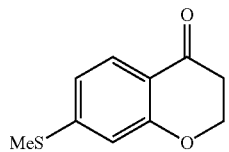 (I-43)
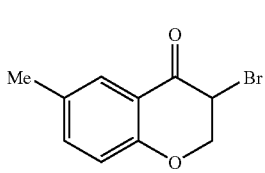 (I-44)
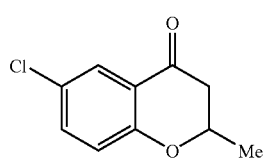 (I-45)
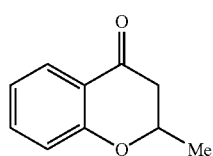 (I-46)
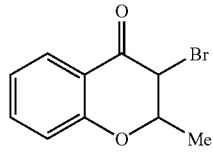 (I-47)
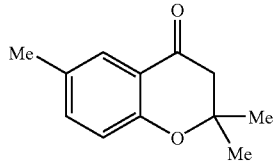 (I-48)
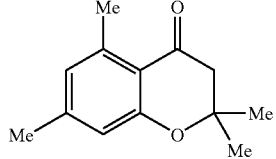 (I-49)
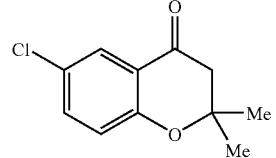 (i-50)
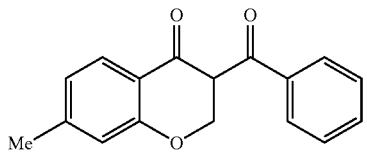 (I-51)
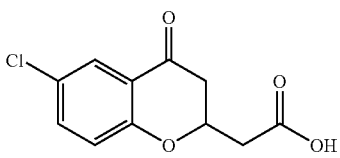 (I-52)
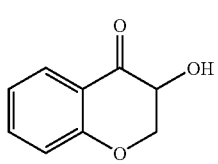 (I-53)

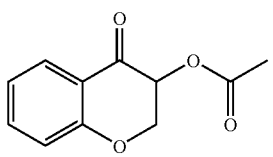 (I-54)
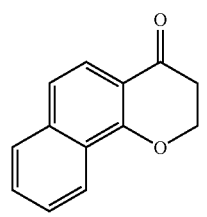 (I-55)
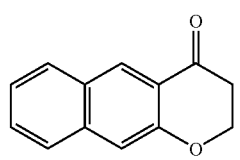 (I-56)
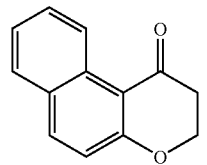 (I-57)
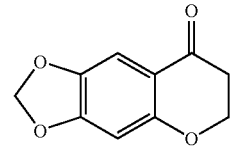 (I-58)
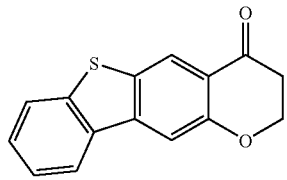 (I-59)
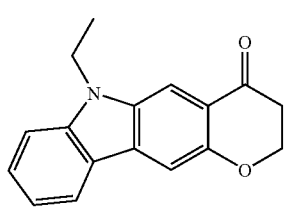 (I-60)
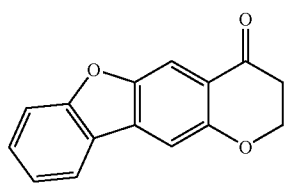 (I-61)
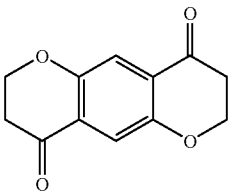 (I-62)
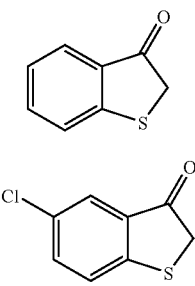 (I-63)
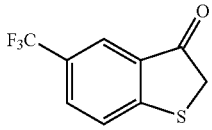 (I-64)
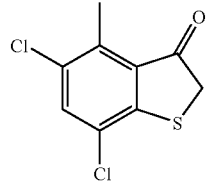 (I-65)
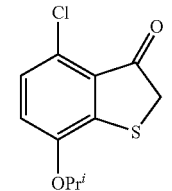 (I-66)
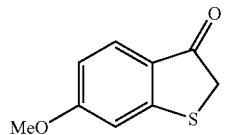 (I-67)
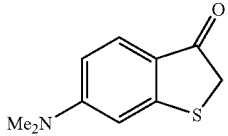 (I-68)
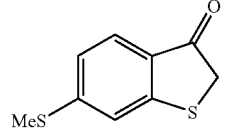 (I-69)
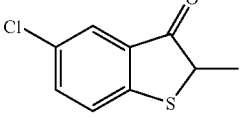 (I-70)
(I-71)

(I-72) 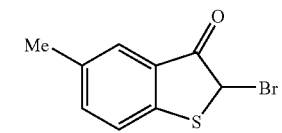
(I-73) 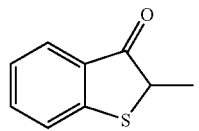
(I-74) 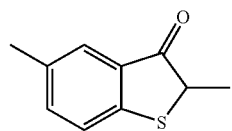
(I-75) 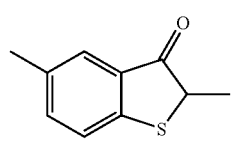
(I-76) 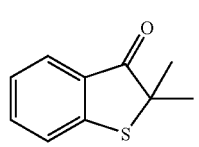
(I-77) 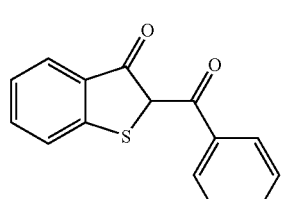
(I-78) 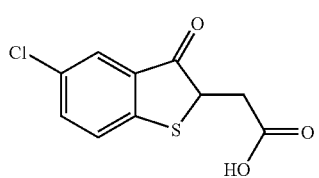
(I-79) 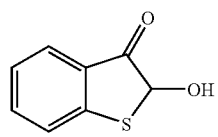
(I-80) 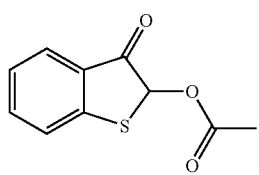
(I-81) 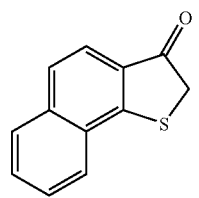
(I-82) 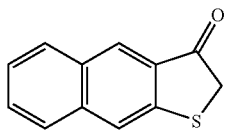
(I-83) 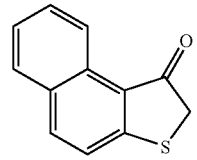
(I-84) 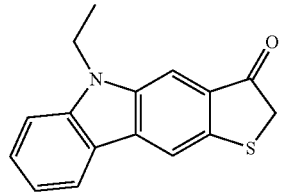
(I-85) 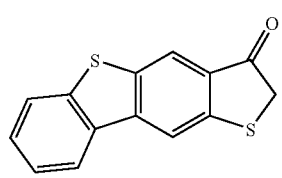
(I-86) 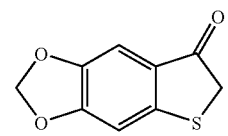
(I-87) 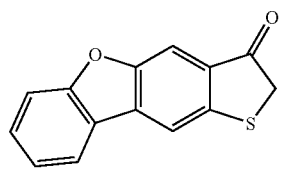
(I-88) 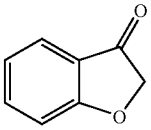
(I-89) 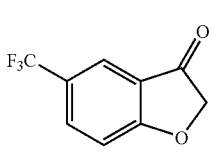
(I-90) 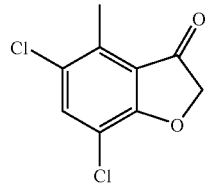
(I-91)

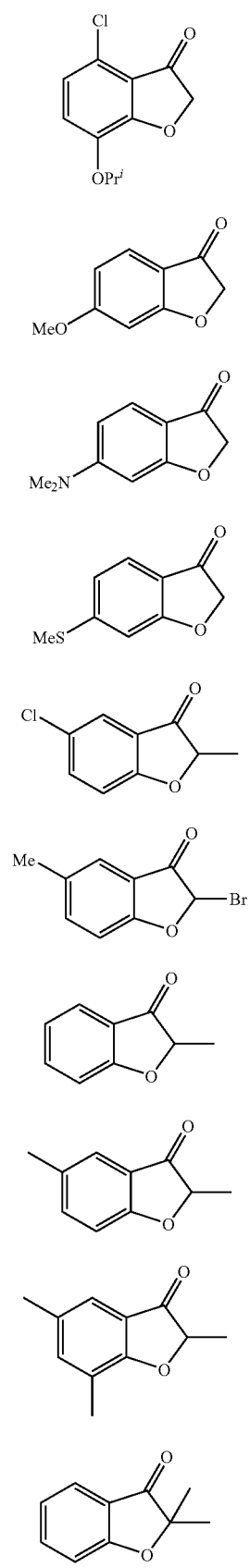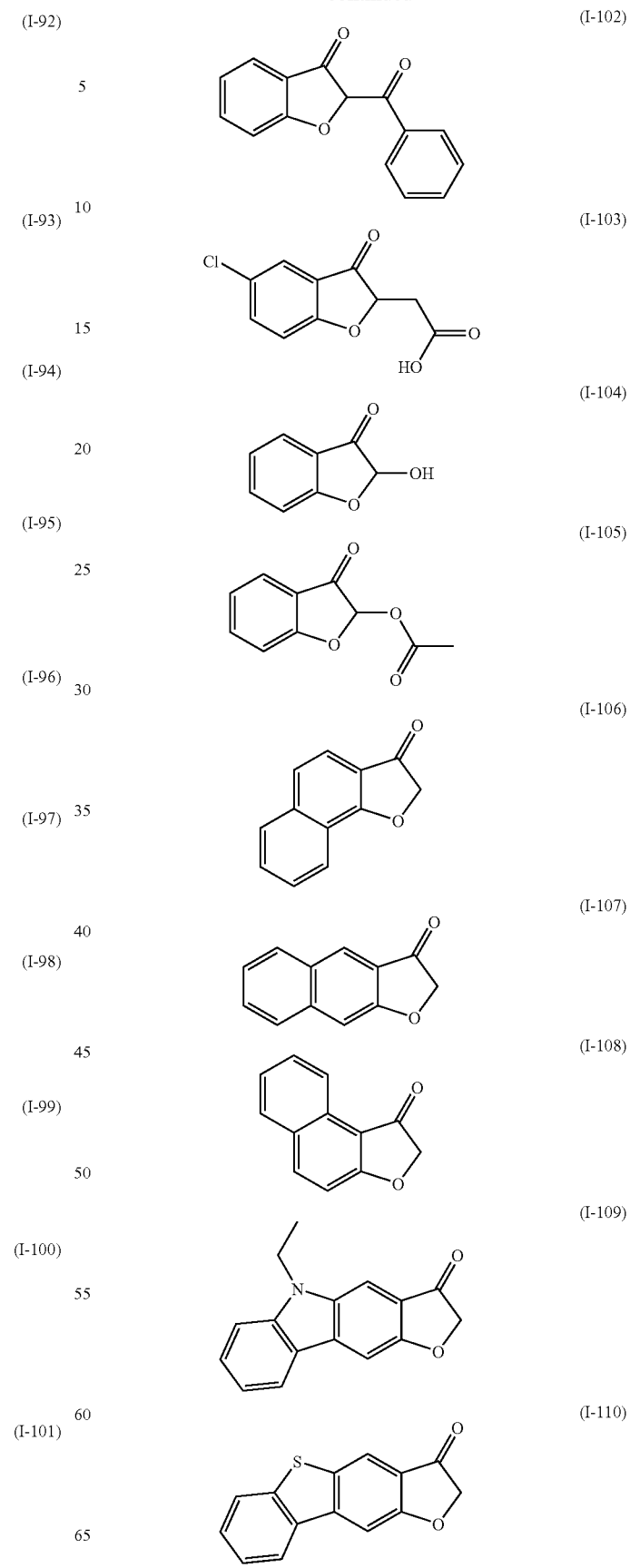

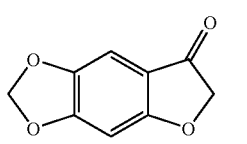 (I-111)
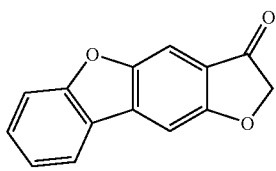 (I-112)
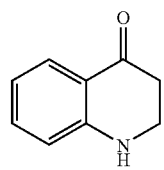 (I-113)
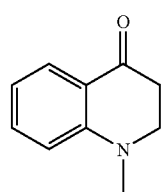 (I-114)
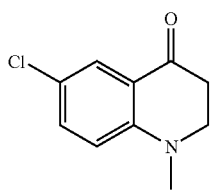 (I-115)
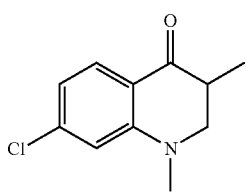 (I-116)
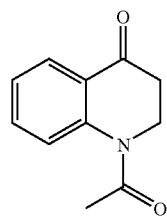 (I-117)
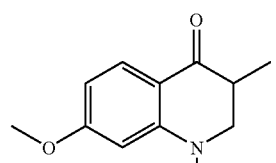 (I-118)
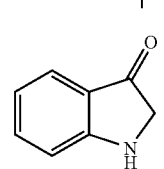 (I-119)
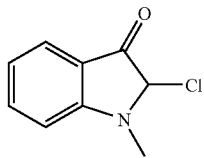 (I-120)
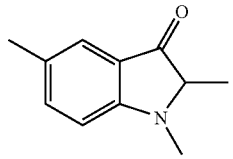 (I-121)
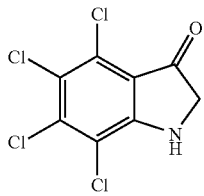 (I-122)
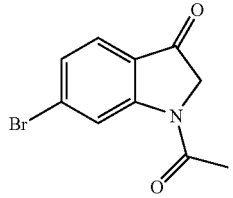 (I-123)
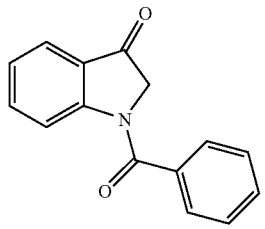 (I-124)
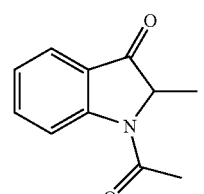 (I-125)
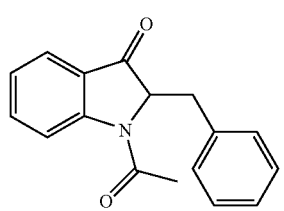 (I-126)
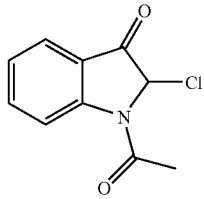 (I-127)

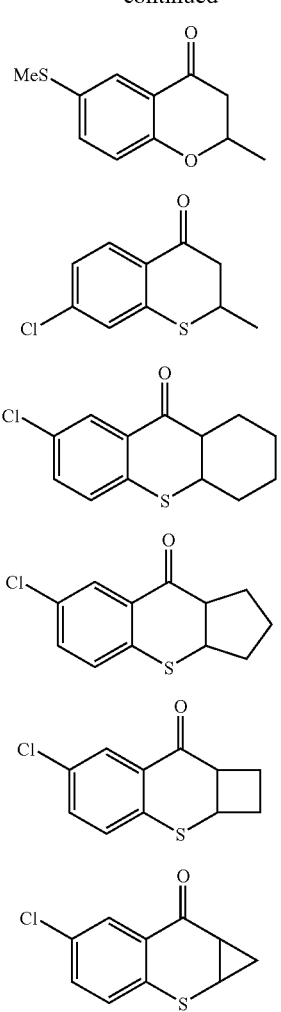

The specific sensitizing dye in the invention can be synthesized by known methods described in, for example, JP-A No. 2004-189695, Tetrahedron, vol. 49, p. 939 (1993), Journal of Organic Chemistry, p. 893. (1945), and Journal of Organic Chemistry, p. 4934 (1965).

The content of the specific sensitizing dye in the ink composition of the invention, in terms of solid content, is preferably in the range of about 0.05 to 30% by weight, more preferably 0.1 to 20% by weight, even more preferably 0.2 to 10% by weight, based on the ink composition.

This specific sensitizing dye hardly shows absorption in the visible light range and is thus advantageous that the dye when added in an amount to exhibit its effect does not influence the hue of the aqueous ink composition. The content of the specific sensitizing dye when described in connection with the polymerization initiator (B) is that the weight ratio of the polymerization initiator (the total amount of the specific polymerization initiator and other polymerization initiator): the specific sensitizing dye is preferably 200:1 to 1:200, more preferably 50:1 to 1:50, still more preferably 20:1 to 1:5.

In the ink composition of the invention, the polymerizable compound (C) described later is present as an emulsion in the ink composition, wherein the specific sensitizing dye (A) may be present in the same phase as that of the polymerizable compound or may be present in the aqueous phase.

When the specific sensitizing dye (A) is allowed to be present in the aqueous phase, the sensitizing dye made water-soluble by introducing hydrophilic substituents such as a carboxyl group (including a salt thereof), a sulfo group (including a salt thereof), and an ethyleneoxy group into the molecule of the sensitizing dye may be used.

In the invention, the specific sensitizing dye (A) is present preferably in the same phase as that of the polymerizable compound (C), from the viewpoint of sensitivity.

At this time, the specific sensitizing dye (A) is preferably soluble in the polymerizable compound (C). The term "soluble" means that the specific sensitizing dye (A) is dissolved at room temperature (25° C.) in an amount of 1% by weight or more, preferably 3% by weight or more, in the polymerizable compound (C). From the viewpoint of preventing precipitation of the specific sensitizing dye (A), the amount of the specific sensitizing dye (A) used is preferably less than the upper limit of the amount thereof dissolved in the polymerizable compound (C) and is specifically more preferably 70% by weight or less.

[Other Sensitizing Dyes]

In the invention, known sensitizing dyes can also be used in combination with the specific sensitizing dye described above in such a range that the effect of the invention is not impaired. The ratio of other sensitizing dyes to the specific sensitizing dye, and the scope of exemplary compounds that can be simultaneously used, are the same as in the first aspect described above.

<(C) Ethylenically Unsaturated Bond-containing Polymerizable Compound>

The ink composition of the invention contains the ethylenically unsaturated bond-containing polymerizable compound (C) (hereinafter referred to sometimes as "polymerizable compound").

One feature of the invention lies in that the ethylenically unsaturated bond-containing polymerizable compound is present in an emulsified state in the ink composition. As such polymerizable compound, a compound having, in its molecule, at least one radical polymerizable ethylenically unsaturated bond, such as a compound having acryloyl and methacryloyl groups, is used.

One feature of the invention is that the polymerizable compound (C) is present in a substantially emulsified state in the aqueous ink composition containing water as a main solvent. Accordingly, the polymerizable compound is selected from those compounds which are water-insoluble, that is, solids at ordinary temperatures under ordinary pressures in a chemical form of monomer, oligomer or polymer.

For forming an emulsified state in the solvent containing water as a major component, it is necessary to select a polymerizable compound which is solid at ordinary temperature (25° C.) under ordinary pressure or is water-insoluble with lipophilicity or hydrophobicity as physical property thereof.

In the invention, the term "water-insoluble" means that the solubility of the compound in water at room temperature (25° C.) is less than 5% by weight, and in the invention, the compound having a solubility of less than 2% by weight is preferably used, and the compound having a solubility of less than 1% by weight is more preferably used.

In the aqueous ink composition, these polymerizable compounds can be confirmed to be present in an emulsified state by observation under an optical microscope, an electron microscope or the like or by a method such as dynamic light scattering method. The particle size of the emulsion is arbitrary as long as jetting performance is influenced, but usually the particle size is preferably in the range 50 to 500 nm.

The method of measuring the particle size distribution of the emulsion in the invention includes known methods such as optical microscopy, confocal laser microscopy, electron microscopy, atomic force microscopy, static light scattering method, laser diffractometry, dynamic light scattering method, centrifuging sedimentation, electric pulse measurement method, chromatography, ultrasonic attenuation method etc., and apparatuses corresponding to the principle of each method are commercially available.

For the particle size range in the invention and ease in measurement, the particle size of dispersed particles is measured preferably by the dynamic light scattering method. Commercial measuring instruments using dynamic light scattering include NANOTRUCK UPA (Nikkiso Co., Ltd.), a dynamic light scattering particle size distribution measuring instrument LB-550 (Horiba, Ltd.), and a density particle size analyzer FPAR-1000 (Otsuka Electronics Co., Ltd.).

Examples of the radical-polymerizable compound capable of forming an emulsified state in the aqueous ink composition includes those compounds which have the physical properties described above and are selected from unsaturated carboxylic acids such as acrylic acid, methacrylic acid, itaconic acid, crotonic acid, isocrotonic acid and maleic acid, their salts, esters, urethanes, acid amides and acid anhydrides, and acrylonitrile, styrene derivatives, various unsaturated polyesters, unsaturated polyethers, unsaturated polyamides, and unsaturated polyurethanes, but the invention is not limited thereto. The radical-polymerizable compound may be a monofunctional compound having, in a molecule, only one ethylenically unsaturated bond or may be a multifunctional compound having a plurality of ethylenically unsaturated bonds.

Hereinafter, examples of the radical-polymerizable compound used preferably in the invention, which can be present in an emulsified state in the aqueous ink composition, are enumerated, but the invention is not limited to these compounds.

<Compound Examples of Acrylates>

In the ink composition of the invention, the acrylates preferably used as the polymerizable compound (C) may be monofunctional or multifunctional and includes, for example, the following compounds.

(Examples of Monofunctional Alkyl Acrylates)

Methyl acrylate, ethyl acrylate, propyl acrylate, isopropyl acrylate, butyl acrylate, isoamyl acrylate, hexyl acrylate, 2-ethylhexyl acrylate, octyl acrylate, decyl acrylate, lauryl acrylate, stearyl acrylate, isobornyl acrylate, cyclohexyl acrylate, dicyclopentenyl acrylate, dicyclopentenyloxyethyl acrylate, and benzyl acrylate.

(Examples of Monofunctional Hydroxy Acrylates)

2-Hydroxyethyl acrylate, 2-hydroxypropyl acrylate, 2-hydroxy-3-chloropropyl acrylate, 2-hydroxy-3-phenoxypropyl acrylate, 2-hydroxy-3-allyloxypropyl acrylate, 2-acryloyloxyethyl-2-hydroxypropyl phthalate.

(Examples of Monofunctional Halogen Acrylates)

2,2,2-Trifluoroethyl acrylate, 2,2,3,3-tetrafluoropropyl acrylate, 1H-hexafluoroisopropyl acrylate, 1H,1H,5H-octafluoropentyl acrylate, 1H,1H,2H,2H-heptadecafluorodecyl acrylate, 2,6-dibromo-4-butylphenyl acrylate, 2,4,6-tribromophenoxyethyl acrylate, and 2,4,6-tribromophenol 3 EO-added acrylate.

(Examples of Monofunctional Ether Acrylates)

2-Methoxyethyl acrylate, 1,3-butyleneglycol methyl ether acrylate, butoxyethyl acrylate, methoxytriethyleneglycol acrylate, methoxypolyethyleneglycol #400 acrylate, methoxydipropyleneglycol acrylate, methoxytripropyleneglycol acrylate, methoxypolypropyleneglycol acrylate, ethoxydiethyleneglycol acrylate, 2-ethylhexylcarbitol acrylate, tetrahydrofurfuryl acrylate, phenoxyethyl acrylate, phenoxydiethyleneglycol acrylate, phenoxypolyethyleneglycol acrylate, cresylpolyethyleneglycol acrylate, p-nonylphenoxyethyl acrylate, p-nonylphenoxypolyethyleneglycol acrylate, and glycidyl acrylate.

(Examples of Monofunctional Carboxyl Acrylates)

β-Carboxyethyl acrylate, succinic acid monoacryloyloxyethyl ester, ω-carboxypolycaprolactone monoacrylate, 2-acryloyloxyethylhydrogen phthalate, 2-acryloyloxypropylhydrogen phthalate, 2-acryloyloxypropylhexahydrohydrogen phthalate, and 2-acryloyloxypropyltetrahydrohydrogen phthalate.

(Examples of Other Monofunctional Acrylates)

N,N-Dimethylaminoethyl acrylate, N,N-dimethylaminopropyl acrylate, morpholinoethyl acrylate, trimethylsiloxyethyl acrylate, diphenyl-2-acryloyloxyethyl phosphate, 2-acryloyloxyethyl acid phosphate, and caprolactone modified 2-acryloyloxyethyl acid phosphate.

(Examples of Bifunctional Acrylates)

1,4-Butanediol diacrylate, 1,6-hexanediol diacrylate, diethyleneglycol diacrylate, triethyleneglycol diacrylate, tetraethyleneglycol diacrylate, polyethyleneglycol #200 diacrylate, polyethyleneglycol #300 diacrylate, polyethyleneglycol #400 diacrylate, polyethyleneglycol #600 diacrylate, dipropyleneglycol diacrylate, tripropyleneglycol diacrylate, tetrapropyleneglycol diacrylate, polypropyleneglycol #400 diacrylate, polypropylene glycol #700 diacrylate, neopentylglycol diacrylate, neopentylglycol PO (propylene oxide) modified diacrylate, hydroxypivalic acid neopentyl glycol ester diacrylate, hydroxypivalic acid neopentyl glycol ester caprolactone-added diacrylate, 1,6-hexanediol bis(2-hydroxy-3-acryloyloxypropyl)ether, 1,9-nonanediol diacrylate, pentaerythritol diacrylate, pentaerythritol diacrylate monostearate, pentaerythritol diacrylate monobenzoate, bisphenol A diacrylate, EO (ethylene oxide) modified bisphenol A diacrylate, PO modified bisphenol A diacrylate, hydrogenated bisphenol A diacrylate, EO modified hydrogenated bisphenol A diacrylate, PO modified hydrogenated bisphenol A diacrylate, bisphenol F diacrylate, EO modified bisphenol F diacrylate, PO modified bisphenol F diacrylate, EO modified tetrabromobisphenol A diacrylate, tricyclodecanedimethylol diacrylate, and isocyanuric acid EO modified diacrylate.

(Examples of Trifunctional Acrylates)

Glycerin PO modified triacrylate, trimethylolpropane triacrylate, trimethylolpropane EO modified triacrylate, trimethylolpropane PO modified triacrylate, isocyanuric acid EO modified triacrylate, isocyanuric acid EO modified 8-caprolactone modified triacrylate, 1,3,5-triacryloylhexahydro-s-triazine, pentaerythritol triacrylate, and dipentaerythritol triacrylate tripropionate.

(Examples of Tetrafunctional or More Acrylates)

Pentaerythritol tetraacrylate, dipentaerythritol pentaacrylate monopropionate, dipentaerythritol hexaacrylate, tetramethylolmethane tetraacrylate, oligoester tetraacrylate, and tris(acryloyloxy)phosphate.

<Compound Examples of Methacrylates>

The methacrylates used preferably as the polymerizable compound (C) in the ink composition of the invention may be monofunctional or multifunctional and includes, for example, the following compounds.

(Examples of Monofunctional Alkyl Methacrylates)

Methyl methacrylate, ethyl methacrylate, propyl methacrylate, isopropyl methacrylate, butyl methacrylate, isoamyl methacrylate, hexyl methacrylate, 2-ethylhexyl methacrylate, octyl methacrylate, decyl methacrylate, lauryl methacrylate, stearyl methacrylate, isobornyl methacrylate, cyclohexyl methacrylate, dicyclopentenyl methacrylate, dicyclopentenyloxyethyl methacrylate, and benzyl methacrylate.

(Examples of Monofunctional Hydroxy Methacrylates)

2-Hydroxyethyl methacrylate, 2-hydroxypropyl methacrylate, 2-hydroxy-3-chloropropyl methacrylate, 2-hydroxy-3-phenoxypropyl methacrylate, 2-hydroxy-3-allyloxypropyl methacrylate, and 2-methacryloyloxyethyl-2-hydroxypropyl phthalate.

(Examples of Monofunctional Halogen Methacrylates)

2,2,2-Trifluoroethyl methacrylate, 2,2,3,3-tetrafluoropropyl methacrylate, 1H-hexafluoroisopropyl methacrylate, 1H,1H,5H-octafluoropentyl methacrylate, 1H,1H,2H,2H-heptadecafluorodecyl methacrylate, 2,6-dibromo-4-butylphenyl methacrylate, 2,4,6-tribromophenoxyethyl methacrylate, and 2,4,6-tribromophenol 3 EO-added methacrylate.

(Examples of Monofunctional Ether Methacrylates)

2-Methoxyethyl methacrylate, 1,3-butyleneglycol methyl ether methacrylate, butoxyethyl methacrylate, methoxytriethyleneglycol methacrylate, methoxypolyethyleneglycol #400 methacrylate, methoxydipropyleneglycol methacrylate, methoxytripropyleneglycol methacrylate, methoxypolypropyleneglycol methacrylate, ethoxydiethyleneglycol methacrylate, 2-ethylhexylcarbitol methacrylate, tetrahydrofurfuryl methacrylate, phenoxyethyl methacrylate, phenoxydiethyleneglycol methacrylate, phenoxypolyethyleneglycol methacrylate, cresylpolyethyleneglycol methacrylate, p-nonylphenoxyethyl methacrylate, p-nonylphenoxypolyethyleneglycol methacrylate, and glycidyl methacrylate.

(Examples of Monofunctional Carboxyl Methacrylates)

β-Carboxyethyl methacrylate, succinic acid monomethacryloyloxyethyl ester, ω-carboxypolycaprolactone monomethacrylate, 2-methacryloyloxyethylhydrogen phthalate, 2-methacryloyloxypropylhydrogen phthalate, 2-methacryloyloxypropylhexahydrohydrogen phthalate, and 2-methacryloyloxypropyltetrahydrohydrogen phthalate.

(Examples of Other Monofunctional Methacrylates)

N,N-Dimethylaminoethyl methacrylate, N,N-dimethylaminopropyl methacrylate, morpholinoethyl methacrylate, trimethylsiloxyethyl methacrylate, diphenyl-2-methacryloyloxyethyl phosphate, 2-methacryloyloxyethyl acid phosphate, caprolactone modified 2-methacryloyloxyethyl acid phosphate.

(Examples of Bifunctional Methacrylates)

1,4-Butanediol dimethacrylate, 1,6-hexanediol dimethacrylate, diethyleneglycol dimethacrylate, triethyleneglycol dimethacrylate, tetraethyleneglycol dimethacrylate, polyethyleneglycol #200 dimethacrylate, polyethyleneglycol #300 dimethacrylate, polyethyleneglycol #400 dimethacrylate, polyethyleneglycol #600 dimethacrylate, dipropyleneglycol dimethacrylate, tripropyleneglycol dimethacrylate, tetrapropyleneglycol dimethacrylate, polypropyleneglycol #400 dimethacrylate, polypropyleneglycol #700 dimethacrylate, neopentylglycol dimethacrylate, neopentylglycol PO modified dimethacrylate, hydroxypivalic acid neopentyl glycol ester dimethacrylate, hydroxypivalic acid neopentyl glycol ester caprolactone-added dimethacrylate, 1,6-hexanediol bis(2-hydroxy-3-methacryloyloxypropyl)ether, 1,9-nonanediol dimethacrylate, pentaerythritol dimethacrylate, pentaerythritol dimethacrylate monostearate, pentaerythritol dimethacrylate monobenzoate, bisphenol A dimethacrylate, EO modified bisphenol A dimethacrylate, PO modified bisphenol A dimethacrylate, hydrogenated bisphenol A dimethacrylate, EO modified hydrogenated bisphenol A dimethacrylate, PO modified hydrogenated bisphenol A dimethacrylate, bisphenol F dimethacrylate, EO modified bisphenol F dimethacrylate, PO modified bisphenol F dimethacrylate, EO modified tetrabromobisphenol A dimethacrylate, tricyclodecanedimethylol dimethacrylate, and isocyanuric acid EO modified dimethacrylate.

(Examples of Trifunctional Methacrylates)

Glycerin PO modified trimethacrylate, trimethylolpropane trimethacrylate, trimethylolpropane EO modified trimethacrylate, trimethylolpropane PO modified trimethacrylate, isocyanuric acid EO modified trimethacrylate, isocyanuric acid EO modified ε-caprolactone modified trimethacrylate, 1,3,5-trimethacryloylhexahydro-s-triazine, pentaerythritol trimethacrylate, and dipentaerythritol trimethacrylate tripropionate.

(Examples of Tetrafunctional or More Methacrylates)

Pentaerythritol tetramethacrylate, dipentaerythritol pentamethacrylate monopropionate, dipentaerythritol hexamethacrylate, tetramethylolmethane tetramethacrylate, oligoester tetramethacrylate, and tris(methacryloyloxy) phosphate.

Hereinafter, compounds, which are used preferably as the polymerizable compound (C) in the invention other than acrylates and methacrylates, are mentioned.

<Compound Examples of Arylates>

Allyl glycidyl ether, diallyl phthalate, triallyl trimellitate, and isocyanuric acid triarylate.

<Compound Examples of Acid Amides>

Acrylamide, N-methylol acrylamide, diacetone acrylamide, N,N-dimethylacrylamide, N,N-diethylacrylamide, N-isopropylacrylamide, acryloyl morpholine, methacrylamide, N-methylolmethacrylamide, diacetone methacrylamide, N,N-dimethylmethacrylamide, N,N-diethylmethacrylamide, N-isopropylmethacrylamide, and methacryloyl morpholine.

<Compound Examples of Styrenes>

Styrene, p-hydroxystyrene, p-chlorostyrene, p-bromostyrene, p-methylstyrene, p-methoxystyrene, p-t-butoxystyrene, p-t-butoxycarbonylstyrene, p-t-butoxycarbonyloxystyrene, and 2,4-diphenyl-4-methyl-1-pentene.

<Examples of Other Vinyl Compounds>

Vinyl acetate, vinyl monochloroacetate, vinyl benzoate, vinyl pivalate, vinyl butyrate, vinyl laurate, divinyl adipate, vinyl methacrylate, vinyl crotonate, vinyl 2-ethylhexanoate, N-vinylcarbazole, N-vinylpyrrolidone etc.

In the aqueous ink composition, the polymerizable compound that can exist in a substantially emulsified state includes the following monomer examples and commercial products in addition to the exemplary compounds described above.

Trifunctional or more monomers: pentaerythritol tetraacrylate (trade name: M-450, manufactured by Toa Gosei Co., Ltd.), polyester acrylate (trade name: M-81000, manufactured by Toa Gosei Co., Ltd.), bifunctional monomers: neopentylglycol diacrylate (trade name: NK Ester NPG, manufactured by Shin-Nakamura Chemical Co., Ltd.), urethane acrylate (trade name: M-1210, manufactured by Toa Gosei Co., Ltd.), polyester acrylate (trade name: M-6200, manufactured by Toa Gosei Co., Ltd.), monofunctional monomers: 2-ethylhexyl carbitol acrylate (trade name: M-120, manufactured by Toa Gosei Co., Ltd.), N-vinylpyrrolidone etc.

The content of the polymerizable compound (C) in the ink composition of the invention may be determined appropriately depending on the content of the polymerization initiator (B) and the preferably weight ratio thereto, but in terms of solid content, is usually preferably in the range of 2 to 70% by weight, more preferably in the range of 3 to 30% by weight, still more preferably in the range of 5 to 20% by weight.

<(D) Water>

The ink composition of the invention contains water as a main solvent.

Water to be used is preferably impurity-free deionized water, distilled water or the like.

The content of water in the ink composition of the invention is preferably 10 to 97% by weight. In the case of the inkjet recording ink composition, the water content is preferably 30 to 95% by weight, more preferably 50 to 95% by weight.

<Water-soluble Organic Solvent>

The aqueous ink composition of the invention contains water as a main solvent, and depending on the object, a water-soluble organic solvent is preferably simultaneously used in the solvent.

The water-soluble organic solvent that can be used in the invention includes, for example, alcohols (for example, methanol, ethanol, propanol, isopropanol, butanol, isobutanol, secondary butanol, tertiary butanol, pentanol, hexanol, cyclohexanol, benzyl alcohol etc.), polyhydric alcohols (for example, ethylene glycol, diethylene glycol, triethylene glycol, polyethylene glycol, propylene glycol, dipropylene glycol, polypropylene glycol, butylene glycol, hexane diol, pentane diol, glycerin, hexane triol, thiodiglycol etc.), polyhydric alcohol ethers (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether etc.), amines (for example, ethanolamine, diethanolamine, triethanolamine, N-methyldiethanolamine, N-ethyldiethanolamine, morpholine, N-ethyl morpholine, ethylenediamine, diethylenediamine, triethylenetetramine, tetraethylenepentamine, polyethyleneimine, pentamethyldiethylenetriamine, tetramethylpropylenediamine etc.), amides (for example, formamide, N,N-dimethylformamide, N,N-dimethylacetamide etc.), heterocycles (for example, 2-pyrrolidone, N-methyl-2-pyrrolidone, cyclohexyl pyrrolidone, 2-oxazolidone, 1,3-dimethyl-2-imidazolizinone etc.), sulfoxides (for example, dimethylsulfoxide etc.), sulfones (for example, sulfolane etc.), urea, acetonitrile, acetone etc. Preferable examples of the water-soluble organic solvent include polyhydric alcohols. The polyhydric alcohol and polyhydric alcohol ether are preferably simultaneously used.

The water-soluble organic solvents may be used alone or in combination thereof. The total amount of the water-soluble organic solvents added to the ink composition is 5 to 60% by weight, preferably 10 to 35% by weight.

<(E) Colorant>

When the ink composition of the invention is used in applications such as formation of image regions on a planographic printing plate, formation of colored images is not particularly essential, and for application to such ink, a colorant is not particularly necessary. However, when the visibility of image regions formed by the ink composition is to be improved or colored images are to be formed using the ink composition, a colorant can be contained in the composition.

Although the colorant that can be used in the invention is not particularly limited, the polymerizable compound (C) is present in an emulsified state in water in the ink composition, and thus it is possible to use the colorant in any of the following aspects: aspect (1) wherein a pigment is used as the colorant and dispersed in an aqueous medium, aspect (2) wherein an oil-soluble dye is used as the colorant, dissolved in the polymerizable compound and allowed to be present in an emulsion phase formed by the polymerizable compound, and aspect (3) wherein a water-soluble dye is used as the colorant and dissolved in an aqueous phase, and these can be simultaneously used, but because the pigment is generally superior in weatherability to the dye, and thus the pigment is preferably used as the colorant.

(Pigment)

The pigment that can be used as the colorant (E) in the invention can be a conventionally known colored organic or inorganic pigment.

Examples of the pigment include azo pigments such as azo lakes, insoluble azo pigments, condensed azo pigments and chelate azo pigments, polycyclic pigments such as phthalocyanine pigments, perylene and perylene pigments, anthraquinone pigments, quinacridone pigments, dioxazine pigments, thioindigo pigments, isoindolinone pigments and quinophthalone pigments, dye lakes such as basic dyed lakes and acid dyes lakes, organic pigments such as nitro pigments, nitroso pigments, aniline black, and daylight fluorescent pigments, and inorganic pigments such as carbon black.

Magenta or red pigments include, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 194, C.I. Pigment Red 209, C.I. Pigment Red 222, and C.I. Pigment Red 224.

Orange or yellow pigments include, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, and C.I. Pigment Yellow 180.

Green or cyan pigments include, for example, C.I. Pigment Blue 15, C.I. Pigment Blue 15:2, C.I. Pigment Blue 15:3, C.I. Pigment Blue 16, C.I. Pigment Blue 60, C.I. Pigment Green 7, and C.I. Pigment Green 36.

Black pigments include, for example, carbon black etc. White pigments include, for example, Pigment White 6, 18, 21 etc.

In these pigments, a pigment dispersant may be used if necessary. The pigment dispersant that can be used herein includes, for example, activators such as higher fatty acid salts, alkyl sulfates, alkyl ester sulfates, alkyl sulfonates, sulfosuccinates, naphthalene sulfonates, alkyl phosphates, polyoxyalkylene alkyl ether phosphates, polyoxyalkylene alkyl phenyl ethers, polyoxyethylene polyoxypropylene glycols, glycerin esters, sorbitan esters, polyoxyethylene fatty acid amides and amine oxides, as well as a block copolymer, a random copolymer, and a salt thereof, selected from 2 or more monomers such as styrene, styrene derivatives, vinyl naphthalene derivatives, acrylic acid, acrylic acid derivatives, maleic acid, maleic acid derivatives, itaconic acid, itaconic acid derivatives, fumaric acid, and fumaric acid derivatives.

In the ink composition of the invention, a self-dispersing pigment can also be used. As used herein, the self-dispersing pigment refers to a pigment capable of dispersing without a dispersant and is preferably pigment particles having polar groups on the surface thereof.

As used herein, the pigment particles having polar groups on the surface thereof refers to pigment particles modified directly with polar groups on the surface thereof or to an organic matter having organic pigment cores to which polar groups are bound directly or via joint (referred to hereinafter as pigment derivatives).

The polar group includes, for example, a sulfonic acid group, a carboxylic acid group, a phosphate group, a borate group and a hydroxyl group, and is preferably a sulfonic acid group or a carboxyl group, more preferably a sulfonic acid group.

The method of obtaining the pigment particles having polar groups on the surface includes those methods described in, for example, WO97/48769, JP-A Nos. 10-110129, 11-246807, 11-57458, 11-189739, 11-323232 and JP-A No. 2000-265094 wherein the surfaces of pigment particles are oxidized with a suitable oxidizing agent thereby introducing polar groups such as a sulfonic acid group or a salt thereof into at least a part of the surface of the pigment. Specifically, carbon black is oxidized with conc. nitric acid, or color pigments can be prepared by oxidization with sulfamic acid, sulfonic acid pyridine salt or amidosulfuric acid in sulfolane or N-methyl-2-pyrrolidone. A reaction product rendered water-soluble by excessive oxidation in these reactions may be removed thereby purifying and giving the intended pigment dispersion. When a sulfonic acid group is introduced by oxidation into the surface, the acidic group may be neutralized if necessary with a basic compound.

Other methods of obtaining pigment particles having polar groups on the surface thereof include those methods described in JP-A Nos. 11-49974, 2000-273383 and 2000-303014 wherein pigment derivatives are adsorbed, by treatment such as milling, onto the surfaces of pigment particles, those methods described in Japanese Patent Application Nos. 2000-377068, 2001-1495, and 2001-234966 wherein a pigment is dissolved together with a pigment derivative in a solvent and then crystallized in a poor solvent. In any of these methods, pigment particles having polar groups on the surface can be easily obtained.

The polar group on the surface of the pigment may be in the form of a free salt or may have a counter salt. The counter salt includes, for example, inorganic salts (lithium, sodium, potassium, magnesium, calcium, aluminum, nickel, ammonium) and organic salts (triethyl ammonium, diethyl ammonium, pyridinium, triethanol ammonium etc.) and is preferably a counter salt having monovalency.

In a method of dispersing the pigment, various dispersing machines such as a ball mill, a sand mill, an attritor, a roll mill, an agitator, a Henschel mixer, a colloid mill, an ultrasonic wave homogenizer, a pearl mill, a wet-type jet mill and a paint shaker can be used. For the purpose of removing coarse particles in the pigment dispersion, use of a centrifugal separator or a filter is also preferable.

(Oil-soluble Dye)

As described above, the ink composition of the invention may contain an oil-soluble dye as the colorant.

The oil-soluble dye that can be used in the invention is explained below.

The oil-soluble dye that can be used in the invention means a dye that is substantially insoluble in water. Specifically, the solubility in water at 25° C. (the weight of dye that can be dissolved in 100 g of water) is 1 g or less, preferably 0.5 g or less, more preferably 0.1 g or less. Therefore, the oil-soluble dye means a so-called water-insoluble pigment or an oil-soluble dye, among which the oil-soluble dye is preferable.

Among the oil-soluble dyes that can be used in the invention, yellow dyes may be arbitrary ones. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the invention, magenta dyes may be arbitrary ones. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Among the oil-soluble dyes that can be used in the invention, cyan dyes may be any ones. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit respective colors of yellow, magenta and cyan, only after a part of their chromophore (chromogenic atomic group) dissociates. In this case, the counter cation may be an inorganic cation such as an alkali metal or ammonium, may be an organic cation such as pyridinium or a quaternary ammonium salt, or may be a polymer cation having the above cation as a partial structure.

Preferred specific examples thereof include, but not limited to, C.I. Solvent Black 3, 7, 27, 29, and 34; C.I. Solvent Yellow 14, 16, 19, 29, 30, 56, 82, 93, and 162; C.I. Solvent Red 1, 3, 8, 18, 24, 27, 43, 49, 51, 72, 73, 109, 122, 132, and 218; C.I. Solvent Violet 3; C.I. Solvent Blue 2, 11, 25, 35, 38, 67, and 70; C.I. Solvent Green 3 and 7; and C.I. Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the invention, oil-soluble dyes may be used alone or as a mixture of two or more thereof.

When the oil-soluble dye is used as the colorant, it may be used in combination with other colorants such as water-soluble dyes, disperse dyes and pigments to such an extent that the effect of the invention is not hindered.

(Water-soluble Dye)

The water-soluble dye that can be used in the ink composition of the invention will be described.

The composition using a dye as the colorant, unlike the composition using the above pigment, is hardly usable in a state completely free from fading arising from irradiation with an active energy ray and is accompanied by fading to some degree. From this reason, when a dye is used as the colorant of ink, a so-called azo-containing metal dye that has formed a complex with a metal ion is preferably used because of less fading.

The scope of the water-soluble black dyes, yellow dyes, magenta days and cyan dyes are the same as in the first aspect described above.

When the oil-soluble dye and water-soluble dye are used as the colorant, the content (total amount of the dyes) in the ink composition is in the range of 0.1 to 10% by weight based on the total amount of the ink composition. An ink composition wherein the concentration of the dye is low can be applied preferably to light-colored inks among density modulating inks.

<Other Additives>

In the ink composition of the invention, known additives can be simultaneously used besides the essential components (A) to (D) and the colorant (E) in such a range that the effect of the invention is not impaired. Hereinafter, additives that can be used in the ink composition will be described.

(Surfactant)

A surfactant can be added to the ink composition of the invention. The surfactant that can be preferably used in the invention includes anionic surfactants such as dialkyl sulfosuccinates, alkyl naphthalene sulfonates and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkyl amine salts and quaternary ammonium salts. Particularly, anionic surfactants and nonionic surfactants can be preferably used.

In the invention, a high-molecular surfactant can also be used, and the following water-soluble resins can be mentioned as preferable high-molecular surfactants from the viewpoint of jetting stability. Examples of the preferably used water-soluble resins include a styrene-acrylic acid-alkyl acrylate ester copolymer, a styrene-acrylic acid copolymer, a styrene-maleic acid-alkyl acrylate ester copolymer, a styrene-maleic acid copolymer, a styrene-methacrylic acid-alkyl acrylate ester copolymer, a styrene-methacrylic acid copolymer, a styrene-maleic acid half ester copolymer, a vinyl naphthalene-acrylic acid copolymer, and a vinyl naphthalene-maleic acid copolymer.

(Latex)

A latex can be added to the ink composition of the invention. The latex that can be used in the invention includes, for example, a styrene-butadiene copolymer, polystyrene, an acrylonitrile-butadiene copolymer, an acrylate copolymer, polyurethane, a silicon-acrylic copolymer and an acrylic modified fluorine resin. The latex may be a latex wherein polymer particles have been dispersed with an emulsifier or a so-called soap-free latex wherein polymer particles have been dispersed without using an emulsifier. As the emulsifier, a surfactant is often used, and a polymer having a water-soluble group such as a sulfonic acid group, a carboxylic acid group or the like (for example, a polymer to which a soluble group has been graft-bound, a polymer obtained from both a monomer having a soluble monomer and a monomer having an insoluble moiety) is also preferably used.

The soap-free latex refers to a latex not using an emulsifier or to a latex using, as an emulsifier, a polymer having a water-soluble group such as a sulfonic acid group, a carboxylic acid group or the like (for example, a polymer to which a soluble group has been graft-bound, a polymer obtained from both a monomer having a soluble monomer and a monomer having an insoluble moiety).

Besides the latex wherein polymer particles that are uniform throughout the particles have been dispersed, there is in recent years a latex wherein core-shell type polymer particles different in composition between the core and shell thereof have been dispersed, and this type of latex can also be preferably used.

The average particle size of polymer particles in the latex used in the ink composition of the invention is preferably 10 nm to 300 nm, more preferably 10 nm to 100 nm. When the average particle size of the polymer particles in the latex in the ink composition is within the range defined above, the gloss of an image, water resistance, and scratch resistance can be improved. The average particle size of polymer particles in the latex can be determined with a commercially available particle size measuring instrument using light scattering, electrophoresis, or laser Doppler.

The latex, when used in the ink composition of the invention, is added preferably in an amount of 0.1 to 20% by weight, more preferably 0.5 to 10% by weight, in terms of solid content of the latex. When the solid content of the latex added is 0.1% by weight or more, an effect of improving water resistance can be exhibited, while when the solid content is 20% by weight or less, excellent ink storage stability can be maintained without any problems generated by the influence of latex, such as an increase in ink viscosity with time and an increase in the particle diameter of dispersed pigment.

(Aqueous Polymers)

An aqueous polymer can be added to the ink composition of the invention.

Preferable examples of the aqueous polymer include natural polymers, and specific examples thereof include proteins such as glue, gelatin, casein or albumin, natural rubbers such as gum arabic or tragacanth gum, glucosides such as saponin, alginic acid and alginic acid derivatives such as alginic acid propylene glycol ester, alginic acid triethanolamine, or ammonium alginate, and cellulose derivatives such as methyl cellulose, carboxymethyl cellulose, hydroxyethyl cellulose, or ethylhydroxy cellulose.

Other preferable examples of the aqueous polymer include synthetic polymers and include polyvinyl alcohols, polyvinyl pyrrolidones, acrylic resins such as polyacrylic acid, acrylic acid-acrylonitrile copolymers, potassium acrylate-acrylonitrile copolymers, vinyl acetate-acrylate copolymers, or acrylic acid-acrylate copolymers, styrene acrylic acid resins such as styrene-acrylic acid copolymers, styrene-methacrylic acid copolymers, styrene-methacrylic acid-acrylate copolymers, styrene-$\alpha$-methylstyrene-acrylic acid copolymers or styrene-$\alpha$-methylstyrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, and vinyl acetate copolymers such as vinyl acetate-ethylene copolymers, vinyl acetate-fatty acid vinyl ethylene copolymers, vinyl acetate-maleate copolymers, vinyl acetate-crotonic acid copolymers, or vinyl acetate-acrylic acid copolymers, and salts thereof. Among them, polyvinyl pyrrolidones can be mentioned as particularly preferable examples.

The molecular weight of the water-soluble polymer that can be used in the invention is preferably 1,000 to 200,000, more preferably 3,000 to 20,000. When the molecular weight is lower than 1,000, an effect of inhibiting growth and aggregation of pigment particles is decreased. When the molecular weight is higher than 200,000, there easily occur problems such as an increase in viscosity, dissolution insufficiency, etc.

The amount of the water-soluble polymer added is preferably 10 to 1,000% by weight, more preferably 50 to 200% by weight, based on the pigment dissolved. When the amount is lower than 10% by weight, an effect of inhibiting growth and aggregation of pigment particles is decreased. When the amount is higher than 1000% by weight, there easily occur problems such as an increase in viscosity, dissolution insufficiency, etc.

Depending on the object of improving jetting stability, compatibility with a print head and an ink cartridge, storage stability, image storage stability and other properties as necessary, various additives known in the art, for example, a viscosity regulator, a surface tension regulator, a specific resistance regulator, a film forming agent, a dispersant, a surfactant, a UV absorber, an antioxidant, a fading inhibitor, an antifungal agent and a rust preventive, in addition to the respective components described above, can be appropriately selected and used in the ink of the invention. Examples thereof include oil droplet microparticles of liquid paraffin, dioctyl phthalate, tricresyl phosphate, and silicon oil, the UV absorbers described in JP-A Nos. 57-74193, 57-87988 and 62-261476, the fading inhibitors described in JP-A Nos. 57-74192, 57-87989, 60-72785, 61-146591, 1-95091, and 3-13376, the fluorescent whitening agents described in JP-A Nos. 59-42993, 59-52689, 62-280069, 61-242871 and 4-219266, and pH regulators such as sulfuric acid, phosphoric acid, citric acid, sodium hydroxide, potassium hydroxide, and potassium carbonate.

(Method of Preparing the Ink Composition)

The ink composition of the invention contains the polymerizable compound (C) being present in an emulsified state in the ink composition. For preparation of such ink composition, a non-aqueous phase may be first prepared and then dispersed in a usual manner in an aqueous medium to prepare an emulsion.

The non-aqueous phase contains at least the polymerizable compound and further preferably contains the polymerization initiator, the specific sensitizing dye etc. which are compatible with the polymerizable compound, to form a uniform phase.

For improving dispersion stability, the aqueous medium (aqueous phase) preferably contains the water-soluble polymer, the surfactant etc.

The previously prepared composition for forming a non-aqueous phase is dispersed in an aqueous solvent to emulsify the polymerizable compound, wherein formation of the emulsion can be carried out using a known method and apparatus to which ultrasonic dispersion, high-pressure emulsification or the like is applied, and as the apparatus, a supersonic dispersing apparatus, a micromixer, a microreactor or the like can be used as necessary.

The particle size of the emulsion can be regulated by appropriately regulating stirring conditions (shear strength, temperature, pressured) during emulsification, the conditions under which the dispersing apparatus is used, and the ratio of the non-aqueous phase to the aqueous medium phase.

The ink composition of the invention is constituted as described above, is thus highly sensitively curable with an active radiation and is usable in various applications to ink.

In particular, the ink composition of the invention, which is excellent in storage stability and has relatively low viscosity with water as a main component, can be said to exhibit its significant effect when used in inkjet recording.

The advantage of using the active radiation-curing aqueous ink composition of the invention in image formation with the aqueous inkjet system is that excellent jetting stability is attainable because the component involved in polymerization curing has been added in an emulsified state to the aqueous medium in the ink composition.

That is, in order that the aqueous ink composition of the invention is used in the inkjet system, its viscosity should be kept in an appropriate range with an aqueous solvent, and simultaneously the surface tension should be optimized with the solvent. From the viewpoint of jetting stability, there is also an advantage that since the polymerizable compound present in an emulsified state, and the polymerization initiator and the sensitizing dye, coexist in the same phase in the preferable aspect of the invention, an excellent jetting ability can be achieved, and unlike the case where such compounds are dissolved in a water-soluble solvent, there is no concern about the deterioration in jetting ability by precipitation, in the solvent, of the component involved in curing.

The ink composition of the invention has a viscosity of preferably 15 mPa·s or less, more preferably 5 to 15 mPa·s or less, at 50° C.

The ink viscosity (mPa·s) referred to in the invention is not particularly limited as long as it is tested with a viscosity calibration standards stipulated in JIS Z 8809, and the viscosity is a value measured at 50° C. by a known method. The viscosity measurement instrument includes a rotating, vibrating or narrow-tube viscometer such as Saybolt viscometer or Redwood viscometer. Examples of such viscometers include a cone-and-plate E type viscometer manufactured by Tokimec, E type viscometer (rotating viscometer) manufactured by Toki Sangyo Co., Ltd., Type B viscometer BL manufactured by Tokyo Keiki Kogyo K. K., FVM-80A manufactured by Yamaichi Electrics Co., Ltd., Viscoliner manufactured by Nametore Kogyo, and VISCO MATE MODEL VM-1A and DD-1 manufactured by Yamaichi Electrics Co., Ltd.

The surface tension of the ink composition of the invention is preferably 35 mN/m or less, more preferably 20 to 35 mN/m.

The surface tension (mN/m) of the ink composition is surface tension measured at 50° C., and can be determined as described in general reference books in surface chemistry and colloid chemistry, for example, "Shinjikken Kagaku Koza (New Course of Experimental Chemistry), 18th ed., Kaimen to Koroido (Interface and Colloid)" pp. 68 to 117 (1977) edited by the Chemical Society of Japan and published by Maruzen Co., Ltd. Specifically, the surface tension may be measured according to a ring method (Du Nouy method) and a platinum plate method (Wilhelmy method). In the invention, the surface tension (N/m) is measured by the platinum plate method using, for example, a surface tension-measuring device CBVP-Z manufactured by Kyowa Interface Science Co., Ltd.

The method of attaining the above-defined viscosity or surface tension of the ink composition is not particularly limited, and the desired viscosity or surface tension can be attained by appropriately regulating the type and concentration of the pigment, the type and concentration of the polymerizable compound, and the type and concentration of the surfactant.

Then, the inkjet recording medium that can be used in the invention will be described.

The recording medium used in the invention includes metals such as aluminum, iron and copper, plastics such as vinyl chloride, acryl, polycarbonate, polyethylene terephthalate, acrylonitrile/butadiene/styrene copolymers, polyethylene, and polypropylene, ceramics such as glass, as well as wood, paper, printing paper and fiber.

The recording medium to which the ink composition of the invention is applied is preferably a nonabsorbable medium which does not absorb ink, from the viewpoint of the ability of the polymerizable compound contributing to image formation to be present, without absorption, on the surface of the recording medium.

The base material of such recording medium is also preferably ink-nonabsorbable one. The term "ink-nonabsorbable" means that the material is not fibrous such as paper to absorb ink, does not use, as an ink-absorbing layer on a film, a resin to be swollen by absorbing ink, or does not have an ink-absorbing layer provided therein with voids by using fillers or resin particles. Specifically, the ink-nonabsorbable material is preferably one generally used as a soft packaging material. The material of the soft packaging material is preferably polyester, polyolefin, polyamide, polyester amide, polyether, polyimide, polyamide imide, polystyrene, polycarbonate, poly-p-phenylene sulfide, polyether ester, polyvinyl chloride, poly(meth)acrylates, polyethylene, polypropylene, or nylon. Alternatively, a copolymer thereof, a blend thereof, or a crosslinked product thereof can also be used. In particular, stretched polyethylene terephthalate, polystyrene, polypropylene or nylon is preferable from the viewpoint of dimensional stability, rigidity, environmental burden, and cost. The thickness of the film is 2 to 100 μm, preferably 6 to 45 μm, more preferably 10 to 30 μm.

<Inkjet Recording Method>

Then, the inkjet recording method of the invention and the inkjet recording apparatus applicable to the method will be described.

The inkjet recording method of the invention is a method that comprises jetting the ink composition of the invention for inkjet recording onto a recording medium (a support, a recording material or the like) and irradiating the jetted ink composition with an active irradiation to cure the ink thereby forming an image.

That is, the inkjet recording method of the invention includes (a) jetting the ink composition of the invention onto a recording medium and (b) irradiating the jetted ink composition with an active irradiation to cure the ink composition.

The inkjet recording method of the invention comprises the steps (a) and (b) described above, thereby forming an image by the ink composition cured on the recording medium.

An inkjet recording apparatus described in detail below can be used in the step (a) in the inkjet recording method of the invention.

<Inkjet Recording Apparatus>

The inkjet recording apparatus used in the recording method of the invention is not particularly restricted, and a known inkjet recording apparatus capable of achieving intended resolution may be arbitrarily selected and used. That is, any known inkjet recording apparatuses including commercial ones may be used in jetting the ink onto a recording medium in the step (a) in the inkjet recording method of the invention.

The inkjet recording apparatus that can be used in the invention is equipped with, for example, an ink supply system, a temperature sensor, and an active radiation source.

The ink supply system comprises, for example, a main tank containing the ink composition of the invention, a supply pipe, an ink supply tank immediately before an inkjet head, a filter, and a piezo system inkjet head. The piezo system inkjet head may be driven so as to eject a multisize dot of 1 to 100 pl, preferably 8 to 30 pl, at a resolution of 320×320 dpi to 4,000× 4,000 dpi, preferably 400×400 dpi to 1,600×1,600 dpi, more preferably 720×720 dpi. As used herein, "dpi" means the number of dots per 2.54 cm.

As described above, since it is desirable that the radiation-curing ink be jetted at a constant temperature, a section from the ink supply tank to the inkjet head is thermally insulated and heated. A method of controlling temperature is not particularly limited, but it is preferable to provide, for example, temperature sensors at a plurality of pipe section positions, thereby controlling heating according to the ink flow rate and the temperature of the surroundings. The temperature sensors may be provided on the ink supply tank and in the vicinity of the inkjet head nozzle. The head unit that is to be heated is preferably thermally shielded or insulated so that the main body of the apparatus is not influenced by the temperature of the outside air. In order to reduce the printer start-up time required for heating or in order to reduce the thermal energy loss, it is preferable to thermally insulate the head unit from other sections and also to reduce the heat capacity of the entire heated unit.

Then, the step (b) of irradiating the jetted ink composition with an active radiation to cure the ink composition will be described.

The ink composition jetted on the recording medium is cured by irradiation with an active radiation. This is because the radical polymerization initiator contained in the ink composition of the invention, upon irradiation with an active radiation, is decomposed to generate an initiating species such as radical, an acid or a base, to cause and promote, by the function of the initiating species, the polymerization reaction of the specific monofunctional (meth)acrylic acid derivative and another polymerizable compound used in combination as necessary, thereby curing the ink composition. At this time, when the polymerization initiator and the sensitizing dye are coexistent in the ink composition, the sensitizing dye in the system absorbs an active radiation to be raised to an excited state. The excited sensitizing dye, when coming into contact with the radical polymerization initiator, promotes the decomposition of the polymerization initiator to achieve a highly sensitive curing reaction.

The active radiation that is used herein includes α-rays, γ-rays, electron beam, X-rays, UV-rays, visible rays and IR rays. The peak wavelength of the active radiation, although depending on the absorption characteristics of the sensitizing dye, is preferably in the range of 200 to 600 nm, more preferably in the range of 300 to 450 nm, still more preferably in the range of 350 to 420 nm.

The polymerization initiation system in the invention has sufficient sensitivity even by a low-output active radiation. Accordingly, the output of the active radiation is preferably up to 2,000 mJ/cm$^2$, more preferably in the range of 10 to 2,000 mJ/cm$^2$, still more preferably 20 to 1,000 mJ/cm$^2$, particularly preferably 50 to 800 mJ/cm$^2$.

Desirably, the active radiation is irradiated at the exposed surface illuminance of 10 to 2,000 mW/cm$^2$, preferably 20 to 1,000 mW/cm$^2$.

As an active radiation source, a mercury lamp, a gas/solid laser, etc. are mainly used. For UV-curing inkjet recording ink, a mercury lamp and a metal halide lamp are widely known. However, from the viewpoint of protection of the environment, there has recently been a strong desire for mercury-free ink, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Light-emitting diodes (LED) and laser diodes (LD) may be used as the source of active radiation. Particularly when a UV ray source is needed, a UV-LED or a UV-LD may be used. For example, Nichia Corporation has marketed a violet LED having a wavelength of the main emission spectrum of between 365 nm and 420 nm. When a shorter wavelength is needed, U.S. Pat. No. 6,084,250 discloses an LED that can emit an active radiation whose wavelength is centered between 300 nm and 370 nm. Further, another violet LED is available, and irradiation can be carried out with a radiation of different UV bandwidth. The active radiation source particularly preferable in the invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, particularly preferably 50 to 800 mJ/cm$^2$.

The ink composition of the invention is desirably exposed to such active radiation for a time of, for example, 0.01 to 120 sec., preferably 0.1 to 90 sec.

Irradiation conditions and a basic method for irradiation with active radiation are disclosed in JP-A No. 60-132767. Specifically, a light source is provided on both sides of a head unit that includes an ink jetting device, and the head unit and the light source are made to scan by a so-called shuttle system. Irradiation with active radiation is carried out after a certain time (e.g. 0.01 to 0.5 sec., preferably 0.01 to 0.3 sec., more preferably 0.01 to 0.15 sec.) has elapsed from when the ink has spotted. By controlling the time from ink spotting to irradiation so as to be a minimum in this way, it becomes possible to prevent the ink that has spotted on a recording medium from spreading before curing. Since the ink can be exposed before it reaches a deep area of a porous recording medium that the light source cannot reach, it is possible to prevent monomer from remaining unreacted, and as a result the odor can be reduced.

Curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light. Such curing method may also be applied to the inkjet recording method of the invention.

By employing such inkjet recording method, it is possible to maintain a uniform dot diameter for spotted ink even for various types of recording media having different surface wettability, thereby improving the image quality. In order to obtain a color image, it is preferable to superimpose colors in order from those with low luminosity. By superimposing inks in order from one with low lightness, it is easy for radiation to reach a lower ink, the curing sensitivity is improved, the amount of residual monomer decreases, odor is reduced, and an improvement in adhesiveness can be expected. Although it is possible to eject all colors and then expose them at the same time, it is preferable to expose one color at a time from the viewpoint of promoting curing.

In this way, the ink composition of the invention is cured with high sensitivity by irradiation with an active radiation, thereby forming a hydrophobic image on the surface of the recording medium.

The active radiation source used in curing of ink, or preferable irradiation conditions thereof, are also the same as described in the inkjet recording method.

The ink composition of the invention can be cured with high sensitivity by an active radiation to form hydrophobic regions excellent in adhesion to a support and in film properties. Accordingly, the ink composition can be used not only in formation of colored images or in marking but also in formation of image regions on a planographic printing plate, and by this application, a planographic printing plate excellent in image qualities and in durability can be obtained.

For the above reason, the ink composition of the invention is not only excellent for use in inkjet recording but is also naturally useful as a generally used ink composition.

The aqueous ink composition of the invention is an aqueous ink using water as a medium, and thus a drying step can be arranged after the curing step with the active ray irradiation.

The drying method is not particularly limited, and a known drying unit can be suitably selected and used. The drying method includes, for example, a method of spraying hot air having regulated temperature and humidity, a method of delivery on a heat plate, and a method of passage between heating rolls having a heater inside. By such drying step, solvent removal and curing can be accelerated to rapidly achieve image formation.

The ink composition of the invention is constituted as described above and is thus excellent in jetting stability and curable with high sensitivity. Accordingly, images formed from the ink composition by the inkjet recording method have high qualities.

EXAMPLES

Hereinafter, the first and second aspects of the present invention will be described with reference to Examples, but the invention is not limited to these Examples. The following Examples relate to aqueous ink compositions for UV inkjet recording having various colors. The term "part" means "part by weight", unless otherwise indicated.

-First Aspect-

Example 1

The following components were stirred with a high-speed water cooling-type stirrer to obtain an aqueous ink composition for UV inkjet recording.

(Aqueous Ink Composition)

| | |
|---|---|
| Pigment Blue 15:3 pigment dispersion (pigment 10%) | 40.0 parts |
| Polymerizable compound: Exemplary Compound 2-3 | 15.0 parts |
| Polymerization initiator: Exemplary Compound 1-1 | 1.5 parts |
| Sensitizing dye: Exemplary Compound I-1 | 0.5 part |
| Reactive diluent: acryloyl morpholine | 5.0 parts |
| Hydrogen donor: triethanolamine | 0.5 part |
| Deionized water | 37.5 parts |
| 2 N aqueous sodium hydroxide | amount for adjustment to pH 8.5 |

<Evaluation of the Aqueous Ink Composition>

The resulting aqueous ink composition was used in printing on a sheet made of polyvinyl chloride and then irradiated with light by allowing the sheet to pass under an iron-doped ultraviolet ray lamp (power of 120 W/cm$^2$) at a velocity varying to attain a desired integrated light exposure (shown in Table 2), thereby curing the ink thereon to form a printed material. The evaluation results of the aqueous ink composition and the printed material are shown in Table 2.

-Sensitivity-

With an integrating actiometer UV PowerMAP (trade name, produced by EIT Inc.), exposure energy in the curing step was measured. As a result, it was confirmed that the integrated exposure amount of UV rays on the sheet was about 330 mJ/cm$^2$, and it was thus confirmed that the ink composition was cured with high sensitivity. The curability was judged according to the surface tackiness of the printed material; that is, plain paper (copy paper C2 manufactured by Fuji Xerox Co., Ltd.) was pressed against the printed material just after printing, and curability was judged to be not good when transfer of the coloring liquid occurred, or judged to be good when transfer of the coloring liquid did not occur.

-Jetting Stability-

The resulting aqueous ink composition was stored at room temperature for 4 weeks, and then used in printing on a recording medium with an inkjet recording apparatus having a piezo inkjet nozzle. When printing was continued at ordinary temperature for 48 hours, dot deletion and ink spreading were visually observed and evaluated under the following criteria. The results are shown in Table 2.

A: Dot deletion or ink spreading did not occur, or occurred 3 times or less.
B: Dot deletion or ink spreading occurred 4 to 10 times.
C: Dot deletion or ink spreading occurred 11 times or more.

The ink supply system in the inkjet recording apparatus used in evaluation consisted of a main tank, a supply pipe, an ink supply tank immediately before an inkjet head, a filter, and a piezo system inkjet head, wherein a section from the ink supply tank to the inkjet head was thermally insulated and heated. A temperature sensor was arranged in the ink feeding tank and in the vicinity of a nozzle of the ink jet head respectively so that the temperature of the nozzle was regulated to be always 40±2° C. The piezo system inkjet head was driven so as to eject a multisize dot of 8 to 30 pl at a resolution of 720×720 dpi. As used herein, "dpi" means the number of dots per 2.54 cm.

Examples 2 to 7

Comparative Examples 1 to 6

Mixtures having the compositions in Tables 1 and 2 below were stirred with a high-speed water cooling-type stirrer to yield UV inkjet ink compositions. The pH was adjusted to 8.5 with 2 N aqueous sodium hydroxide. The results of the aqueous ink compositions and printed materials evaluated in the same manner as in Example 1 are shown in Table 3. Comparative Compound 3-1 used in Tables 1 and 2 is the following compound:

TABLE 1

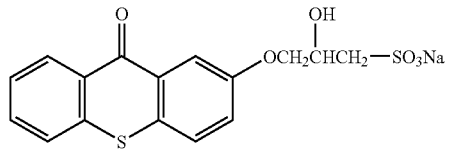

| | | Example 1 | Example 2 | Example 3 | Example 4 | Example 5 | Example 6 | Example 7 |
|---|---|---|---|---|---|---|---|---|
| Colorant | PB15:3 dispersion (pigment 10%) | 40 | 40 | 40 | 40 | 40 | 40 | 40 |
| Polymerizable compound | Exemplary Compound 2-1 | | | | | | 12 | |
| | Exemplary Compound 2-2 | | | | | | 3 | 10 |
| | Exemplary Compound 2-3 | 15 | 15 | 15 | 15 | 15 | | |
| | Exemplary Compound 2-4 | | | | | | | 5 |
| Polymerization initiator | Exemplary Compound 1-1 | 1.5 | | 1.5 | 1.5 | 1.5 | 1.5 | 1.5 |
| | Exemplary Compound 1-2 | | 1.5 | | | | | |
| Sensitizing dye | Exemplary Compound i-i | 0.5 | 0.5 | 0.5 | | | 0.5 | 0.5 |
| | Exemplary Compound i-7 | | | | 0.5 | | | |
| | Exemplary Compound i-8 (n: average D) | | | | | 0.5 | | |
| | Comparative Compound 3-1 | | | | | | | |
| Hydrogen donor | Triethanolamine | 0.5 | 0.5 | | 0.5 | 0.5 | 0.5 | 0.5 |
| Reactive diluent | Acryloyl morpholine | 5 | 5 | 5 | 5 | 5 | 5 | 5 |
| Deionized water | | 37.5 | 37.5 | 38 | 37.5 | 37.5 | 37.5 | 37.5 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| Colorant | PB15:3 dispersion (pigment 10%) | 40 | 40 | 40 | 40 | 40 | 40 |
| Polymerizable compound | Exemplary Compound 2-1 | | | 12 | 12 | | |
| | Exemplary Compound 2-2 | | | 3 | 3 | 10 | 10 |
| | Exemplary Compound 2-3 | 15 | 15 | | | | |
| | Exemplary Compound 2-4 | | | | | 5 | 5 |
| Polymerization initiator | Exemplary Compound 1-1 | 1.5 | 1.5 | 1.5 | 1.5 | 1.5 | 1.5 |
| | Exemplary Compound 1-2 | | 1.5 | | | | |
| Sensitizing dye | Exemplary Compound i-1 | | | | | | |
| | Exemplary Compound i-7 | | | | | | |
| | Exemplary Compound i-8 (n: average D) | | | | | | |
| | Comparative Compound 3-1 | | 0.5 | | 0.5 | | 0.5 |
| Hydrogen donor | Triethanolamine | 0.5 | 0.5 | 0.5 | 0.5 | 0.5 | 0.5 |
| Reactive diluent | Acryloyl morpholine | 5 | 5 | 5 | 5 | 5 | 5 |
| Deionized water | | 38 | 37.5 | 38 | 37.5 | 38 | 37.5 |

TABLE 3

| | Integrated light exposure (mJ/cm²) | Curability | Jetting stability |
|---|---|---|---|
| Example 1 | 540 | Good | A |
| Example 2 | 540 | Good | A |
| Example 3 | 660 | Good | A |
| Example 4 | 720 | Good | A |
| Example 5 | 540 | Good | B |
| Example 6 | 540 | Good | A |
| Example 7 | 540 | Good | A |
| Comparative Example 1 | 720 | not good | A |
| Comparative Example 2 | 600 | Good | C |
| Comparative Example 3 | 720 | not good | A |
| Comparative Example 4 | 660 | Good | C |
| Comparative Example 5 | 720 | not good | A |
| Comparative Example 6 | 660 | Good | C |

As shown in Table 2, it can be seen that Examples 1 to 7 where the specific sensitizing dye of the invention was used are excellent in curability even with a low exposure, as compared with Comparative Examples 1, 3 and 5 where the sensitizing dye was not used. It can be seen that these examples are excellent in jetting stability as compared with Comparative Examples 2, 4 and 6 where the generally used thioxanthone compound (Comparative Compound 3-1) was used as the sensitizing dye. The comparison between Example 1 and Example 5 indicates that the composition using a sensitizing dye having a carboxyl group is superior in jetting stability. The comparison between Example 1 and Example 4 indicates that the composition using a sensitizing dye having a halogen atom is superior in curability.

-Second Aspect-

Example 8

[Preparation of Yellow Ink Composition]

<Preparation of Pigment Dispersion 1>

The following compounds were mixed and then dispersed with a horizontal bead mill (System Zeta Mini, manufactured by Ashizawa) charged to a volume ratio of 60% with zirconia beads of 0.3 mm in diameter. Then, the dispersion was diluted to a pigment concentration of 5% by weight with deionized water and then subjected to ultrafiltration to remove impurities. Then, the dispersion was ion-exchanged and then centrifuged to make the particle size uniform to give a pigment dispersion 1.

(Composition of Pigment Dispersion 1)

| | |
|---|---|
| C.I. Pigment Yellow 128 | 166 g |
| Polymer dispersant (styrene/2-ethylhexyl acrylate/n-butyl acrylate/styrenesulfonic acid = 64/16/15/5) | 32 g |
| Diethylene glycol | 180 g |
| Deionized water | 1000 g |

<Preparation of Photopolymerization Compound Dispersion 1>

100 g of polyester diacrylate (bifunctional, acid value 10 or less), 2.0 g of IRGACURE 907 (manufactured by Ciba Specialty Chemicals Inc.), and 1.0 g of Exemplary Compound I-14 were dissolved in 200 g of ethyl acetate, and then 500 ml water and 5 g of sodium dodecylsulfate were added to the mixture which was then dispersed by sonication. From the resulting polymerizable compound dispersion, the ethyl acetate was removed by evaporation with an evaporator, and then the dispersion was centrifuged and then subjected to ultrafiltration, thereby purifying the dispersion and regulating the particle size distribution, to prepare a polymerizable compound dispersion 1. The presence of an emulsion in this polymerizable compound dispersion was confirmed by observing this dispersion under an optical microscope. The particle size of the emulsion as determined with a dynamic light scattering particle size measurement instrument NANOTRUCK UPA-EX150 manufactured by Nikkiso Co., Ltd. was 0.14 μm.

(Preparation of an Ink Composition)

30 g (in terms of solid content) of the pigment dispersion 1 prepared above, 330 g of the polymerizable compound dispersion 1 prepared above and 100 g of ethylene glycol were mixed, and further glycerin as a viscosity regulator, sodium dodecylsulfate as a surface tension regulator, and ammonia as a pH regulator were added appropriately thereto, and the volume of the mixture was adjusted to 1 L with water to prepare a yellow ink composition wherein the polymerizable compound was present in an emulsified state.

<Evaluation of the Ink Composition>

The resulting ink composition was used in printing on a sheet made of polyvinyl chloride and then irradiated with light by allowing the sheet to pass under an iron-doped ultraviolet ray lamp (power of 120 W/cm²) at a velocity varying to attain a desired integrated light exposure (shown in Table 4), thereby curing the ink thereon to form a printed material. The evaluation results of the ink composition and the printed material are shown in Table 4.

-Sensitivity-

With an integrating actiometer UV PowerMAP (trade name, produced by EIT Inc.), exposure energy in the curing step was measured. As a result, it was confirmed that the integrated exposure amount of UV rays on the sheet was about 330 mJ/cm², and it was thus confirmed that the ink composition was cured with high sensitivity. The curability was judged according to the surface tackiness of the printed material; that is, plain paper (copy paper C2 manufactured by Fuji Xerox Co., Ltd.) was pressed against the printed material just after printing, and curability was judged to be not good when transfer of the coloring liquid occurred, or judged to be good when transfer of the coloring liquid did not occur.

-Jetting Stability-

The resulting ink composition was stored at room temperature for 4 weeks, and then used in printing on a recording medium with an inkjet recording apparatus having a piezo inkjet nozzle. When printing was continued at ordinary temperature for 48 hours, dot deletion and ink spreading were visually observed and evaluated under the following criteria. The results are shown in Table 4.

A: Dot deletion or ink spreading did not occur, or occurred 3 times or less.
B: Dot deletion or ink spreading occurred 4 to 10 times.
C: Dot deletion or ink spreading occurred 11 times or more.

The ink supply system in the inkjet recording apparatus used in evaluation consisted of a main tank, a supply pipe, an ink supply tank immediately before an inkjet head, a filter, and a piezo system inkjet head, wherein a section from the ink supply tank to the inkjet head was thermally insulated and heated. A temperature sensor was arranged in the ink feeding tank and in the vicinity of a nozzle of the ink jet head respectively so that the temperature of the nozzle was regulated to be always 40±2° C. The piezo system inkjet head was driven so as to eject a multisize dot of 8 to 30 pL at a resolution of 720×720 dpi. As used herein, "dpi" means the number of dots per 2.54 cm.

Examples 9 to 11

Comparative Examples 7 to 8

The composition of the photopolymerizable composition dispersion used in Example 8 was changed to the compositions shown in Table 4 below, and preparation of pigment dispersions and ink compositions was conducted in the same manner as in Example 8, whereby ink compositions in these examples were obtained.

The results of the ink compositions and printed materials evaluated in the same manner as in Example 8 are shown in Table 4.

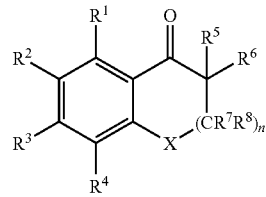

(i)

wherein, in Formula (i), X represents O, S or NR; n represents an integer of 0 or 1; R represents a hydrogen atom,

TABLE 4

Irgacure 907 (manufactured by Ciba Specialty Chemicals Inc.)

(2-Chlorothioxanthone) Comparative Compound 1

| | | Example 8 | Example 9 | Example 10 | Example 11 | Comparative Example 7 | Comparative Example 8 |
|---|---|---|---|---|---|---|---|
| (C) Polymerizable compound | Polyester diacrylate | 100 g | 100 g | 100 g | 100 g | 100 g | 100 g |
| (B) Polymerization initiator | Irgacure 907 | 2.0 g | 2.0 g | — | 0.7 g | 3.0 g | 2.0 g |
| | Exemplary Compound (P-2) | — | — | 2.0 g | 1.3 g | — | — |
| Sensitizing dye | Exemplary Compound (I-14) | 1.0 g | — | 1.0 g | 1.0 g | — | — |
| | Exemplary Compound (I-15) | — | 1.0 g | — | — | — | — |
| | Comparative Compound 1 | — | — | — | — | — | 1.0 g |
| Surfactant | Sodium dodecylsulfate | 5 g | 5 g | 5 g | 5 g | 5 g | 5 g |
| | Ethyl acetate | 200 g | 200 g | 200 g | 200 g | 200 g | 200 g |
| | Water | 500 ml | 500 ml | 500 ml | 500 ml | 500 ml | 500 ml |
| Evaluation results | Integrated light exposure (mJ/cm$^2$) | 600 | 720 | 660 | 540 | 1200 | 600 |
| | Curability | good | good | good | good | not good | good |
| | Jetting stability | A | A | A | A | A | C |

As shown in Table 4, it can be seen that the ink compositions of the invention in Examples 8 to 11 are excellent in curability even with a low exposure, as compared with Comparative Example 7 where the sensitizing dye was not used. It can also be seen that the composition in Comparative Example 8 where the generally used thioxanthone compound was used as the sensitizing dye improves curability but is problematic in jetting stability when used in inkjet recording. The comparison between Example 8 and Example 9 indicates that the composition using, as the specific sensitizing dye, a sensitizing dye having a halogen atom in a molecule is superior in curability.

What is claimed is:

1. An aqueous ink composition comprising at least:

a sensitizing dye represented by the following Formula (i);

an ethylenically unsaturated bond-containing water-soluble polymerizable compound;

a polymerization initiator; and water:

an alkyl group or an acyl group; each of $R^1$, $R^2$, $R^3$, $R^4$, $R^5$, $R^6$, $R^7$ and $R^8$ independently represents a hydrogen atom or a monovalent substituent, provided that any neighboring two of $R^1$, $R^2$, $R^3$ and $R^4$ may be bonded to each other to form a ring, and $R^5$ and $R^7$ or $R^8$, or $R^6$ and $R^7$ or $R^8$, may be bonded to each other to form an aliphatic ring but do not form an aromatic ring.

2. The aqueous ink composition of claim 1, wherein at least one of $R^1$, $R^2$, $R^3$, $R^4$, $R^5$, $R^6$, $R^7$ and $R^8$ in the sensitizing dye represented by Formula (i) is a substituent having a carboxyl group or a salt thereof.

3. The aqueous ink composition of claim 1, wherein the ethylenically unsaturated bond-containing water-soluble polymerizable compound is at least one selected from the group consisting of an unsaturated carboxylic acid, an unsaturated carboxylate, and a compound having both a poly(alkyleneoxy) group and an ethylenically unsaturated group.

4. The aqueous ink composition of claim 1, wherein the polymerization initiator is a water-soluble polymerization initiator.

5. The aqueous ink composition of claim 1, wherein the polymerization initiator is at least one selected from the group consisting of α-aminoketones and acylphosphine oxides.

6. The aqueous ink composition of claim 1, further comprising a colorant.

7. An inkjet recording method, comprising:
(a) jetting the aqueous ink composition of claim 1 onto a recording medium, and
(b) irradiating the jetted aqueous ink composition with active irradiation to cure the aqueous ink composition.

* * * * *